US011444956B2

(12) United States Patent
Gil et al.

(10) Patent No.: US 11,444,956 B2
(45) Date of Patent: *Sep. 13, 2022

(54) SYSTEM AND METHOD FOR DE-ANONYMIZING ACTIONS AND MESSAGES ON NETWORKS

(71) Applicant: VERINT SYSTEMS LTD., Herzliya Pituach (IL)

(72) Inventors: Offri Gil, Hod-Hasharon (IL); Omer Ziv, Rehovot (IL); Yuval Altman, Herzliya (IL); Yaron Gvilli, Kefar Saba (IL); Hodaya Shabtay, Bnei Brak (IL); Omri David, Tzur Yitzhak (IL); Yitshak Yishay, Revava (IL)

(73) Assignee: COGNYTE TECHNOLOGIES ISRAEL LTD., Herzylia Pitauch (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,779

(22) Filed: Apr. 3, 2021

(65) Prior Publication Data

US 2022/0038466 A1 Feb. 3, 2022

Related U.S. Application Data

(63) Continuation of application No. 16/823,421, filed on Mar. 19, 2020, now Pat. No. 10,999,295.

(30) Foreign Application Priority Data

Mar. 20, 2019 (IL) .......................... 265505
Mar. 20, 2019 (IL) .......................... 265509

(51) Int. Cl.
*H04L 9/40* (2022.01)
*H04L 9/06* (2006.01)
(Continued)

(52) U.S. Cl.
CPC .......... *H04L 63/126* (2013.01); *G06F 16/951* (2019.01); *H04L 9/0637* (2013.01);
(Continued)

(58) Field of Classification Search
CPC . H04L 63/04; H04L 63/0421; H04L 63/0428; H04L 63/126; H04L 63/1425;
(Continued)

(56) References Cited

U.S. PATENT DOCUMENTS 5,689,442 A 11/1997 Swanson et al.
6,404,857 B1 6/2002 Blair et al.
(Continued)

FOREIGN PATENT DOCUMENTS

EP 0989499 3/2000
EP 1325655 7/2003
(Continued)

OTHER PUBLICATIONS

Conti, Mauro et al. "Analyzing Android Encrypted Network Traffic to Identify User Actions." IEEE Transactions on Information Forensics and Security 11: 114-125. (Year: 2016).*
(Continued)

*Primary Examiner* — John M MacIlwinen
(74) *Attorney, Agent, or Firm* — Isus Intellectual Property PLLC; Anthony Jason Mirabito

(57) ABSTRACT

A traffic-monitoring system that monitors encrypted traffic exchanged between IP addresses used by devices and a network, and further receives the user-action details that are passed over the network. By correlating between the times at which the encrypted traffic is exchanged and the times at which the user-action details are received, the system associates the user-action details with the IP addresses. In particular, for each action specified in the user-action details, the system identifies one or more IP addresses that may be (Continued)

the source of the action. Based on the IP addresses, the system may identify one or more users who may have performed the action. The system may correlate between the respective action-times of the encrypted actions and the respective approximate action-times of the indicated actions. The system may hypothesize that the indicated action may correspond to one of the encrypted actions having these action-times.

21 Claims, 6 Drawing Sheets

(51) Int. Cl.
  *G06F 16/951*   (2019.01)
  *H04L 67/104*   (2022.01)
  *H04L 61/5007*  (2022.01)
  *H04L 9/00*     (2022.01)

(52) U.S. Cl.
  CPC ...... *H04L 61/5007* (2022.05); *H04L 63/1425* (2013.01); *H04L 67/104* (2013.01); *H04L 9/50* (2022.05)

(58) Field of Classification Search
  CPC . H04L 9/0637; H04L 61/2007; H04L 67/104; H04L 2209/38; H04L 2209/42; H04L 41/064; H04L 41/147; G06F 16/951
  See application file for complete search history.

(56) References Cited

U.S. PATENT DOCUMENTS

| | | |
|---|---|---|
| 6,718,023 B1 | 4/2004 | Zolotov |
| 6,741,992 B1 | 5/2004 | McFadden |
| 6,757,361 B2 | 6/2004 | Blair et al. |
| 7,134,141 B2 | 11/2006 | Crosbie |
| 7,216,162 B2 | 5/2007 | Amit et al. |
| 7,225,343 B1 | 5/2007 | Honig et al. |
| 7,287,278 B2 | 10/2007 | Liang |
| 7,466,816 B2 | 12/2008 | Blair |
| RE40,634 E | 2/2009 | Blair et al. |
| 7,587,041 B2 | 9/2009 | Blair |
| 7,650,317 B2 | 1/2010 | Basu et al. |
| 7,941,827 B2 | 5/2011 | John |
| 7,979,457 B1 | 7/2011 | Garman |
| 8,005,897 B1 | 8/2011 | Roka et al. |
| 8,074,267 B1 | 12/2011 | Stimpson |
| RE43,103 E | 1/2012 | Rozman et al. |
| 8,176,527 B1 | 5/2012 | Njemanze et al. |
| 8,201,245 B2 | 6/2012 | Dewey et al. |
| RE43,528 E | 7/2012 | Rozman et al. |
| RE43,529 E | 7/2012 | Rozman et al. |
| 8,224,761 B1 | 7/2012 | Rockwood |
| RE43,987 E | 2/2013 | Rozman et al. |
| 8,402,543 B1 | 3/2013 | Ranjan et al. |
| 8,413,244 B1 | 4/2013 | Nachenberg |
| 8,499,348 B1 | 7/2013 | Rubin |
| 8,578,493 B1 | 11/2013 | McFadden |
| 8,682,812 B1 | 3/2014 | Ranjan |
| 8,762,948 B1 | 6/2014 | Zaitsev |
| 8,789,181 B2 | 7/2014 | Blackwell |
| 8,838,951 B1 | 9/2014 | Hicks et al. |
| 8,839,417 B1 | 9/2014 | Jordan |
| 8,850,579 B1 | 9/2014 | Kalinichenko |
| 8,868,754 B1 | 10/2014 | Pai |
| 8,869,268 B1 | 10/2014 | Barger |
| 8,959,329 B2 | 2/2015 | Altman |
| 9,225,829 B2 | 12/2015 | Agúndez Dominguez et al. |
| 9,258,313 B1 | 2/2016 | Knappe et al. |
| 9,479,522 B1 | 10/2016 | Cirkovic |
| 9,514,293 B1 | 12/2016 | Moritz et al. |
| 9,641,444 B2 * | 5/2017 | Altman ................. H04L 43/106 |
| 10,491,609 B2 | 11/2019 | Katzir et al. |
| 10,999,295 B2 * | 5/2021 | Gil ...................... H04L 61/2007 |
| 2002/0129140 A1 | 9/2002 | Peled et al. |
| 2003/0018891 A1 | 1/2003 | Hall et al. |
| 2003/0078058 A1 | 4/2003 | Vatanen et al. |
| 2003/0097439 A1 | 5/2003 | Strayer et al. |
| 2003/0097590 A1 | 5/2003 | Syvanne |
| 2003/0103461 A1 | 6/2003 | Jorgenson |
| 2004/0148399 A1 | 7/2004 | Fenizia et al. |
| 2004/0221160 A1 | 11/2004 | Douceur et al. |
| 2005/0018618 A1 | 1/2005 | Mualem et al. |
| 2005/0041590 A1 | 2/2005 | Olakangil et al. |
| 2005/0065889 A1 | 3/2005 | Benaloh |
| 2007/0180509 A1 | 8/2007 | Swartz et al. |
| 2007/0186284 A1 | 8/2007 | McConnell |
| 2007/0192863 A1 | 8/2007 | Kapoor et al. |
| 2007/0271371 A1 | 11/2007 | Singh Ahuja et al. |
| 2007/0294768 A1 | 12/2007 | Moskovitch et al. |
| 2008/0014873 A1 | 1/2008 | Krayer et al. |
| 2008/0028463 A1 | 1/2008 | Dagon et al. |
| 2008/0069437 A1 | 3/2008 | Baker |
| 2008/0082541 A1 | 4/2008 | Davidson et al. |
| 2008/0184371 A1 | 7/2008 | Moskovitch et al. |
| 2008/0196104 A1 | 8/2008 | Tuvell et al. |
| 2008/0222127 A1 | 9/2008 | Bergin |
| 2008/0261192 A1 | 10/2008 | Huang et al. |
| 2008/0267403 A1 | 10/2008 | Boult |
| 2008/0285464 A1 * | 11/2008 | Katzir .................... H04L 63/20 370/241 |
| 2008/0295173 A1 | 11/2008 | Tsvetanov |
| 2009/0106842 A1 | 4/2009 | Durie |
| 2009/0150999 A1 | 6/2009 | Dewey et al. |
| 2009/0271370 A1 | 10/2009 | Jagadish et al. |
| 2010/0002612 A1 | 1/2010 | Hsu et al. |
| 2010/0061235 A1 | 3/2010 | Pai et al. |
| 2010/0091650 A1 | 4/2010 | Brewer et al. |
| 2010/0107223 A1 | 4/2010 | Zheng |
| 2010/0177901 A1 | 7/2010 | Bates et al. |
| 2010/0192222 A1 | 7/2010 | Stokes et al. |
| 2010/0263017 A1 | 10/2010 | Matti et al. |
| 2010/0306185 A1 | 12/2010 | Smith et al. |
| 2011/0238855 A1 | 9/2011 | Korsunsky et al. |
| 2011/0302251 A1 | 12/2011 | Meunier et al. |
| 2011/0314270 A1 | 12/2011 | Lifliand et al. |
| 2012/0093312 A1 | 4/2012 | Gammel et al. |
| 2012/0110677 A1 | 5/2012 | Abendroth et al. |
| 2012/0151046 A1 | 6/2012 | Weiss et al. |
| 2012/0218939 A1 | 8/2012 | Walke et al. |
| 2012/0222117 A1 | 8/2012 | Wong et al. |
| 2012/0240185 A1 | 9/2012 | Kapoor et al. |
| 2012/0243547 A1 | 9/2012 | Pardo-Blazquez et al. |
| 2012/0297051 A1 | 11/2012 | Kakadia et al. |
| 2012/0304244 A1 | 11/2012 | Xie et al. |
| 2012/0311708 A1 | 12/2012 | Agarwal et al. |
| 2012/0327956 A1 | 12/2012 | Vasudevan |
| 2012/0331556 A1 | 12/2012 | Alperovitch et al. |
| 2013/0014253 A1 | 1/2013 | Neou |
| 2013/0096917 A1 | 4/2013 | Edgar et al. |
| 2013/0144915 A1 | 6/2013 | Ravi et al. |
| 2013/0151616 A1 | 6/2013 | Amsterdamski |
| 2013/0166657 A1 | 6/2013 | Tadayon |
| 2013/0191917 A1 | 7/2013 | Warren et al. |
| 2013/0290436 A1 | 10/2013 | Martin et al. |
| 2013/0333038 A1 | 12/2013 | Chien |
| 2014/0059216 A1 | 2/2014 | Jerrim |
| 2014/0075557 A1 | 3/2014 | Balabine et al. |
| 2014/0207917 A1 | 7/2014 | Tock et al. |
| 2014/0214687 A1 | 7/2014 | Huxham |
| 2014/0281030 A1 | 9/2014 | Cui et al. |
| 2014/0298469 A1 | 10/2014 | Marion et al. |
| 2015/0006755 A1 | 1/2015 | Turlington et al. |
| 2015/0019460 A1 | 1/2015 | Simard et al. |
| 2015/0100356 A1 | 4/2015 | Bessler et al. |
| 2015/0100780 A1 | 4/2015 | Rubin et al. |
| 2015/0135326 A1 | 5/2015 | Bailey, Jr. |
| 2015/0149778 A1 | 5/2015 | Nakano |
| 2015/0215221 A1 | 7/2015 | Altman ............... H04L 47/2483 370/241 |
| 2015/0215429 A1 | 7/2015 | Weisblum et al. |
| 2017/0272407 A1 | 9/2017 | Huang et al. |

(56) References Cited

U.S. PATENT DOCUMENTS

| | | | | |
|---|---|---|---|---|
| 2017/0279616 | A1 | 9/2017 | Loeb | H04L 67/02 |
| 2018/0109542 | A1* | 4/2018 | Katzir | G06N 20/00 |
| 2018/0260705 | A1 | 9/2018 | Puzis et al. | |
| 2020/0042897 | A1 | 2/2020 | Fridman et al. | |
| 2020/0111066 | A1* | 4/2020 | Anstey | H04L 67/18 |
| 2021/0105249 | A1* | 4/2021 | Bajaria | G06F 9/542 |

FOREIGN PATENT DOCUMENTS

| | | |
|---|---|---|
| EP | 2104044 | 9/2009 |
| EP | 2437477 | 4/2012 |
| WO | 2002/028121 | 4/2002 |
| WO | 2007/023465 | 3/2007 |
| WO | 2012/075347 | 6/2012 |
| WO | 2018/201237 | 11/2018 |

OTHER PUBLICATIONS

Saltaformaggio et al. Eavesdropping on fine-grained user activities within smartphone apps over encrypted network traffic. In Proceedings of the 10th USENIX Conference on Offensive Technologies (WOOT'16). USENIX Association, USA, 69-78. (Year: 2016).

Su et al. De-anonymizing Web Browsing Data with Social Networks. In Proceedings of the 26th International Conference on World Wide Web (WWW '17). International World Wide Web Conferences Steering Committee, Republic and Canton of Geneva, CHE, 1261-1269. (Year: 2017).

Li et al. "Privacy Leakage via De-Anonymization and Aggregation in Heterogeneous Social Networks," in IEEE Transactions on Dependable and Secure Computing, vol. 17, No. 2, pp. 350-362, Mar. 1-Apr. 2020. Originally Published Sep. 2017. (Year: 2017).

Conti et al. Can't You Hear Me Knocking: Identification of User Actions on Android Apps via Traffic Analysis. In Proceedings of the 5th ACM Conference on Data and Application Security and Privacy (CODASPY '15). Association for Computing Machinery, New York, NY, USA, 297-304. (Year: 2015).

International Search Report and Written Opinion, dated May 25, 2020, received in connection with corresponding International Patent Application No. PCT/IB2020/052555.

Aho, Alfred V., et al., "Efficient String Matching: An Aid to Bibliographic Search," Communication of the ACM, Jun. 1975, vol. 18, No. 6, pp. 333-340.

Altshuler, Y., et al., "How Many Makes a Crowd? on the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

Argamon, S., et al., "Automatically Profiling the Author of an Anonymous Text," Communication of the ACM, vol. 52, No. 2, Feb. 2009, pp. 119-123.

Argamon, S., et al., "Gender, Genre, and Writing Style in Formal Written Texts," Text & Talk, vol. 23, Issue 3, 2003, 32 pages.

Atkinson, M., et al., "Near Real Time Information Mining in Multilingual News," World Wide Web Conference, Apr. 20-24, 2009, 2 pages.

Bilge, Leyla, et al., "EXPOSURE: Finding Malicious Domains Using Passive DNS Analysis," Feb. 2011, 17 pages.

Blum, A., et al., "Combining Labeled and Unlabeled Data with Co-Training," School of Computer Science, Carnegie Mellon University, Proceedings of the Eleventh Annual Conference on Computational Learning theory (COLT'98), 1998, pp. 92-100.

Chawla, N., et al., "SMOTE: Synthetic Minority Over-sampling Technique," Journal of Artificial Intelligence Research, vol. 16, 2002, pp. 321-357.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Conti, M., et al., "Can't You Hear Me Knocking: Identification of User Action on Android Apps via Traffic Analysis," arXiv. org>cs>arXiv:1407.7844, Cornell University 2014, 8 pages.

Corney, M., et al. "Gender-Preferential Text Mining of E-mail Discourse," Proceedings of the 18the Annual Computer Security Applications Conference, 2002, 8 pages.

De Vel, O., et al., "Language and Gender Author Cohort Analysis of E-mail for Computer Forensics," Defence Science and Technology Organisation, Australia, 2002, 16 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Dietrich, C.J., et al., "CoCoSpot: Clustering and recognizing botnet command and control channels using traffic analysis," 2012, pp. 475-486.

Eagle, N., et al., "Inferring friendship network structure by using mobile phone data," PNAS, vol. 106, No. 36, 2009, pp. 15274-15278.

Ermilov, D., et al., "Automatic Bitcoin Address Clustering," $16^{th}$ IEEE International Conference on Machine Learning and Applications (ICMLA), 2017, 7 pages.

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

Estival, D., et al., "Author Profiling for English Emails," Proceedings of the $10^{th}$ Conference of the Pacific Association for Computational Linguistics, 2007, pp. 263-272.

Fanti, G., et al., "Anonymity Properties of the Bitcoin P2P Network," arXiv:1703.08761, 2017, 21 pages.

Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox—IT BV, http//www.foxreplay.com, 2006, 2 pages.

Goldfarb, Eithan, "Mass Link Analysis: Conceptual Analysis," Jun. 24, 2007, Version 1.1, 21 pages.

Goswami, S., et al., "Stylometric Analysis of Bloggers' Age and Gender," Proceedings of the Third International ICWSM Conference, 2009, pp. 214-217.

Grolman, E., et al., "Transfer Learning for User Action Identification in Mobile Apps via Encrypted Traffic Analysis," IEEE Intelligent Systems, vol. 33, Issue 2, 2018, pp. 40-53.

Hanneke, S., et al., "Iterative Labeling for Semi-Supervised Learning," Tech. Rep. No. UIUCDCS-R-2004-2442, Computer Science Department, University of Illinois at Urbana-Champaign, 2004, 13 pages.

Jacob, G., et al., "JACKSTRAWS: Picking Command and Control Connections from Bot Traffic," Proceedings of the $20^{th}$ USENIX Security Symposium, San Francisco, 2011, 16 pages.

Lakhina, A., et al., "Mining Anomalies Using Traffic Feature Distributions," SIGCOMM, 2005, pp. 217-228.

Lin, Z., et al., "Automatic Protocol Format Reverse Engineering through Context-Aware Monitored Execution," Proceedings of the Network and Distributed System Security Symposium, San Diego, California, 2008, 17 pages.

Liu, R-T., et al., "A Fast Pattern-Match Engine for Network Processor-based NIDS," Proceedings of the $20^{th}$ International Conference on Information Technology (ITCC'04), 2006, 23 pages.

Livadas, C., et al., "Using Machine Learning Techniques to Identify Botnet Traffic," In $2^{nd}$ IEEE LCN Workshop on Network Security (WoNS'2006), 2006, pp. 967-974.

Mohrehkesh, S., et al., "Demographic Prediction of Mobile User from Phone Usage," Proceedings Mobile Data Challenge by Nokia Workshop, Newcastle, United Kingdom, 2012, 4 pages.

Navarro, Gonzalo, et al., "Flexible Pattern Matching in Strings: Practical On-Line Search Algorithms for Texts and Biological Sequences," Cambridge University Press, 2002, 166 pages.

(56) References Cited

OTHER PUBLICATIONS

Netronome SSL Inspector Solution Overview White Paper, "Examining SSL-encrypted Communications," 2010, 8 pages.
Nigam, K., et al., "Analyzing the Effectiveness and Applicability of Co-training," Proceedings of the ninth international conference on Information and knowledge management (CIKM'00), 2000, pp. 86-93.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Saltaformaggio, B., et al., "Eavesdropping on Fine-Grained User Activities Within Smartphone Apps Over Encrypted Network Traffic," Proceedings of the $10^{th}$ USENIX Conference on Offensive Technologies (WOOT'16), 2016, pp. 69-78.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodology," 2008 IEEE International Conference on Data Mining Workshops, 2008, pp. 154-163.
Tongaonkar, Alok S., "Fast Pattern-Matching Techniques for Packet Filtering," Stony Brook University, May 2004, 44 pages.
Verint Systems Inc., "Mass Link Analysis: Conceptual Analysis," Jun. 2007, 21 pages.
Verint Systems Inc., "Mass Link Analysis: Solution Description," Dec. 2008, 16 pages.
Wang, H., et al., "NetSpy: Automatic Generation of Spyware Signatures for NIDS," Proceedings of the $22^{nd}$ Annual Computer Security Applications Conference, Miami Beach, Florida, Dec. 2006, ten pages.
Yu, Fang, et al., "Fast and Memory-Efficient Regular Expression Matching for Deep Packet Inspection," ANCS, 06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.

* cited by examiner

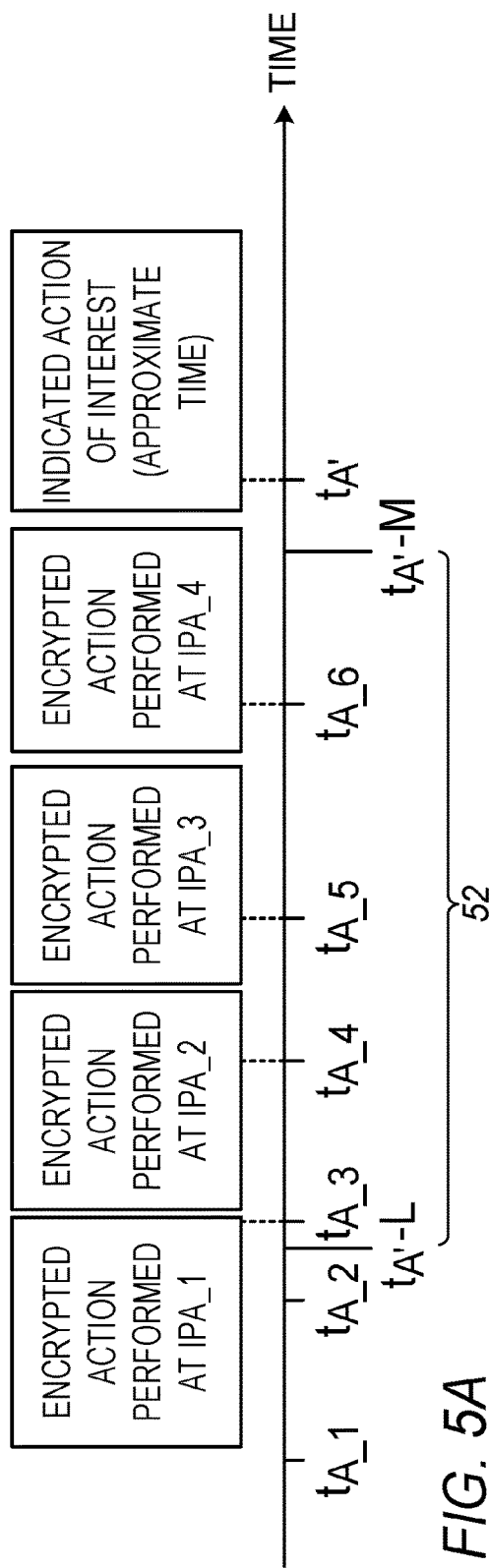
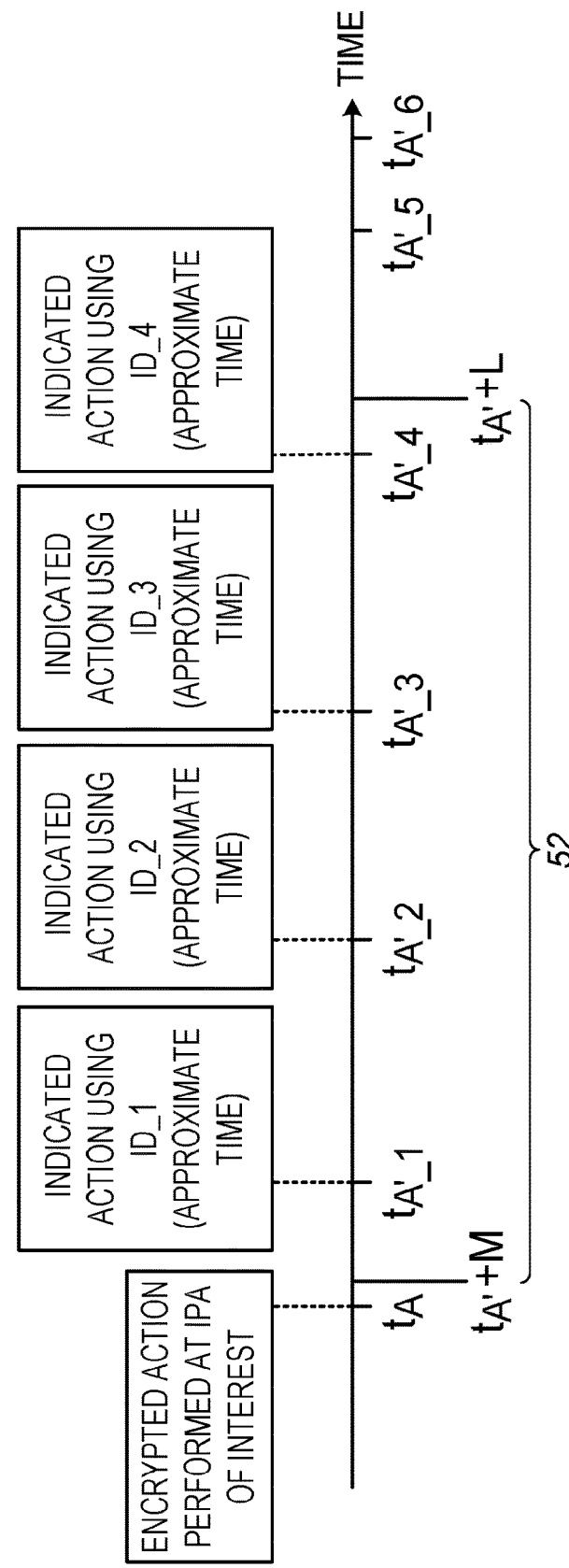
FIG. 5A
FIG. 5B

SYSTEM AND METHOD FOR DE-ANONYMIZING ACTIONS AND MESSAGES ON NETWORKS

FIELD OF THE DISCLOSURE

The present disclosure is related to communication over computer networks.

BACKGROUND OF THE DISCLOSURE

In many cases, the performance of an action over a computer network causes details of the action to be shared over the network.

For example, the performance of a blockchain transaction typically causes details of the transaction to be shared over a peer-to-peer (P2P) blockchain network, such that the transaction may be validated by the members (or "nodes") of the network. In some protocols, a unique identifier of the transaction, known as a transaction hash, is propagated through the P2P network using a gossip protocol, whereby each node that receives the hash forwards the hash to one or more other nodes, which are typically selected at random from the full set of nodes to which the forwarding node is connected. Each of these other nodes may, in response to receiving the hash, request the transaction details from the forwarding node. In Bitcoin transactions, the message containing the hash is known as an "inv" message, while the message requesting the transaction details is known as a "getdata" message.

As another example, the uploading of text or other content to a server may cause the text or other content to be stored in the server and shared by the server, over the Internet, with multiple other users.

U.S. Pat. No. 9,641,444 to Altman describes systems and methods for extracting user identifiers over encrypted communication traffic. An example method includes monitoring multiple flows of communication traffic. A sequence of messages is then sent to a user in accordance with a first temporal pattern. A flow whose activity has a second temporal pattern that matches the first pattern is then identified among the monitored flows. The identified flow is then associated with the user.

SUMMARY OF THE DISCLOSURE

There is provided, in accordance with some embodiments of the present disclosure, a system that includes a communication interface and a processor. The processor is configured to monitor, via the communication interface, one or more flows of encrypted traffic between at least one Internet Protocol (IP) address and a peer-to-peer (P2P) network. The processor is further configured to identify, based on the monitoring, without decrypting the flows, that a particular type of action was performed at the IP address at an action-time. The processor is further configured to receive, from a node in the P2P network, an indication that an action of the particular type was performed. The processor is further configured to identify, in response to receiving the indication, an approximate action-time of the action. The processor is further configured to ascertain that a difference between the approximate action-time and the action-time is within a predefined range, and, in response to ascertaining that the difference is within the predefined range, identify the IP address as a candidate source of the action. The processor is further configured to associate information relating to the action with at least one descriptor that is based on the IP address, in response to identifying the IP address as a candidate source of the action. The processor is further configured to generate an output that indicates the association.

In some embodiments, the processor is configured to receive the indication by receiving a unit of user-action details (UUAD) specifying details of the action.

In some embodiments, the action includes a blockchain transaction.

In some embodiments, the processor is configured to receive the indication by receiving a hash of the transaction.

In some embodiments, the descriptor includes the IP address.

In some embodiments, the descriptor consists of the IP address.

In some embodiments, the descriptor is selected from the group of descriptors consisting of: a device-identifier of a device that used the IP address, an account-identifier of an account to which the IP address was provisioned, and an attribute of a user who used the IP address.

In some embodiments, the processor is further configured to:
compute a likelihood that the IP address was the source of the action, and
based on the likelihood, compute a level of confidence for associating the information with the descriptor,
the processor being configured to generate the output in response to the level of confidence.

In some embodiments, the processor is configured to compute the likelihood based on the difference between the approximate action-time and the action-time.

In some embodiments, the processor is further configured to receive the indication from one or more other nodes in the P2P network, and the processor is configured to compute the likelihood based on respective receipt-times at which the indication was received by the node and by the other nodes.

In some embodiments,
the processor is configured to identify that the particular type of action was performed by identifying a block of packets, belonging to the flows, that was generated in response to the particular type of action,
the information is derived from a unit of user-action details (UUAD) specifying details of the action,
the processor is further configured to identify a degree of correlation between a block-size of the block of packets and a UUAD-size of the UUAD, and
the processor is configured to compute the likelihood in response to the degree of correlation.

In some embodiments, the approximate action-time is a time at which the indication was received by the node.

In some embodiments, the information is derived from a unit of user-action details (UUAD) specifying details of the action.

In some embodiments,
the processor is further configured to:
ascertain that the flows were communicated between the IP address and a particular service, and
ascertain, from the UUAD, that the action was performed using the particular service, and
the processor is configured to identify the IP address as a candidate source of the action in response to (i) ascertaining that the flows were communicated between the IP address and the particular service, and (ii) ascertaining that the action was performed using the particular service.

In some embodiments,
the UUAD indicates that the action was performed at a particular time, and the approximate action-time is the particular time.

In some embodiments, the UUAD indicates that the action was performed under a particular user-identifier, and wherein the information includes the particular user-identifier.

In some embodiments, the particular user-identifier includes a blockchain address.

In some embodiments, the processor is further configured to:
monitor one or more other flows of encrypted traffic between another IP address and the P2P network,
based on the monitoring of the other flows, identify that the particular type of action was performed at the other IP address at another action-time,
identify the other IP address as another candidate source of the action, in response to another difference between the approximate action-time and the other action-time being within the predefined range, and
in response to identifying the other IP address as another candidate source, associate the particular user-identifier with another descriptor that is based on the other IP address.

In some embodiments, the processor is further configured to:
receive, from any node in the P2P network, another indication that another action was performed under the particular user-identifier,
in response to receiving the other indication, identify another approximate action-time of the other action,
based on the other approximate action-time, ascertain that the other IP address was not the source of the other action, and
in response to ascertaining that the other IP address was not the source of the other action, dissociate the particular user-identifier from the other descriptor.

In some embodiments, the processor is further configured to:
receive, from any node in the P2P network, another indication that another action of the particular type was performed,
in response to receiving the other indication, identify another approximate action-time of the other action,
identify the IP address as a candidate source of the other action, in response to another difference between the other approximate action-time and the action-time being within the predefined range, and
in response to identifying the IP address as a candidate source of the other action, associate other information relating to the other action with the descriptor.

In some embodiments, the system further includes the node, and the node is configured to:
in response to the processor identifying that the particular type of action was performed, query another node in the P2P network for any indications of new actions, and
receive the indication in response to the querying.

There is further provided, in accordance with some embodiments of the present disclosure, a method that includes monitoring one or more flows of encrypted traffic between at least one Internet Protocol (IP) address and a peer-to-peer (P2P) network. The method further includes, based on the monitoring, without decrypting the flows, identifying that a particular type of action was performed at the IP address at an action-time. The method further includes receiving, from a node in the P2P network, an indication that an action of the particular type was performed. The method further includes, in response to receiving the indication, identifying an approximate action-time of the action. The method further includes ascertaining that a difference between the approximate action-time and the action-time is within a predefined range, and, in response to ascertaining that the difference is within the predefined range, identifying the IP address as a candidate source of the action. The method further includes, in response to identifying the IP address as a candidate source of the action, associating information relating to the action with at least one descriptor that is based on the IP address, and generating an output that indicates the association.

There is further provided, in accordance with some embodiments of the present disclosure, a computer software product including a tangible non-transitory computer-readable medium in which program instructions are stored. The instructions, when read by a processor, cause the processor to monitor one or more flows of encrypted traffic between at least one Internet Protocol (IP) address and a peer-to-peer (P2P) network. The instructions further cause the processor to identify, based on the monitoring, without decrypting the flows, that a particular type of action was performed at the IP address at an action-time. The instructions further cause the processor to receive, from a node in the P2P network, an indication that an action of the particular type was performed. The instructions further cause the processor to identify, in response to receiving the indication, an approximate action-time of the action, and to ascertain that a difference between the approximate action-time and the action-time is within a predefined range. The instructions further cause the processor to identify the IP address as a candidate source of the action, in response to ascertaining that the difference is within the predefined range. The instructions further cause the processor to associate information relating to the action with at least one descriptor that is based on the IP address, in response to identifying the IP address as a candidate source of the action. The instructions further cause the processor to generate an output that indicates the association.

There is further provided, in accordance with some embodiments of the present disclosure, a system that includes a communication interface and a processor. The processor is configured to monitor, via the communication interface, one or more flows of encrypted traffic between at least one Internet Protocol (IP) address and a network. The processor is further configured to identify, based on the monitoring, without decrypting the flows, that content was uploaded from the IP address at one or more upload-times. The processor is further configured to receive, via the network, one or more units of user-action details (UUADs) specifying respective units of content that were uploaded using a particular user-identifier. The processor is further configured to identify, in response to receiving the UUADs, respective approximate upload-times at which the units of content were uploaded, and to ascertain that respective differences between at least some of the approximate upload-times and respective ones of the upload-times are each within a predefined range. The processor is further configured to identify the IP address as a candidate source of the uploaded units of content, in response to the ascertaining. The processor is further configured to associate the particular user-identifier with at least one descriptor that is based on the IP address, in response to identifying the IP address as a candidate source of the uploaded units of content. The processor is further configured to generate an output that indicates the association.

In some embodiments, the processor is configured to receive at least one of the UUADs from a network crawler.

In some embodiments, the processor is configured to receive at least one of the UUADs by receiving a public feed of uploaded content that includes the UUAD.

In some embodiments, the processor is further configured to:
create a user account, and
register the user account to a group of user accounts, and
the processor is configured to receive at least one of the UUADs via the user account, by virtue of the UUAD having been communicated to the group.

In some embodiments, the descriptor includes the IP address.

In some embodiments, the descriptor consists of the IP address.

In some embodiments, the descriptor is selected from the group of descriptors consisting of: a device-identifier of a device that used the IP address, an account-identifier of an account to which the IP address was provisioned, and an attribute of a user who used the IP address.

In some embodiments, the processor is further configured to compute a level of confidence for associating the particular user-identifier with the descriptor, and the processor is configured to generate the output in response to the level of confidence.

In some embodiments, the processor is configured to compute the level of confidence by:
calculating an upper bound on a likelihood that the IP address was not the source of the uploaded units of content, and
computing the level of confidence as a decreasing function of the upper bound.

In some embodiments, the processor is configured to calculate the upper bound based on $$\binom{N}{K}$$

and respective prior probabilities associated with the at least some of the approximate upload-times,
N being a total number of the UUADs,
K being a number of the at least some of the approximate upload-times, and
each of the prior probabilities being a prior probability of content being uploaded from the IP address at any hypothetical time for which a hypothetical difference between (i) the approximate upload-time associated with the prior probability and (ii) the hypothetical time is within the predefined range.

In some embodiments, the processor is configured to calculate the upper bound based on $$\binom{N}{K}$$

and respective prior probabilities associated with the respective ones of the upload-times,
N being a total number of the upload-times,
K being a number of the respective ones of the upload-times, and
each of the prior probabilities being a prior probability of content being uploaded, using the particular user-identifier, at any hypothetical time for which a hypothetical difference between (i) the upload-time associated with the prior probability and (ii) the hypothetical time is within the predefined range.

In some embodiments, the approximate upload-times are respective times at which the UUADs were received.

In some embodiments, the UUADs indicate that the units of content were uploaded at respective particular times, and the approximate upload-times are the particular times.

There is further provided, in accordance with some embodiments of the present disclosure, a method that includes monitoring one or more flows of encrypted traffic between at least one Internet Protocol (IP) address and a network. The method further includes, based on the monitoring, without decrypting the flows, identifying that content was uploaded from the IP address at one or more upload-times. The method further includes receiving, via the network, one or more units of user-action details (UUADs) specifying respective units of content that were uploaded using a particular user-identifier. The method further includes, in response to receiving the UUADs, identifying respective approximate upload-times at which the units of content were uploaded, and ascertaining that respective differences between at least some of the approximate upload-times and respective ones of the upload-times are each within a predefined range. The method further includes, in response to the ascertaining, identifying the IP address as a candidate source of the uploaded units of content. The method further includes, in response to identifying the IP address as a candidate source of the uploaded units of content, associating the particular user-identifier with at least one descriptor that is based on the IP address, and generating an output that indicates the association.

There is further provided, in accordance with some embodiments of the present disclosure, a computer software product including a tangible non-transitory computer-readable medium in which program instructions are stored. The instructions, when read by a processor, cause the processor to monitor one or more flows of encrypted traffic between at least one Internet Protocol (IP) address and a network. The instructions further cause the processor to identify, based on the monitoring, without decrypting the flows, that content was uploaded from the IP address at one or more upload-times. The instructions further cause the processor to receive, via the network, one or more units of user-action details (UUADs) specifying respective units of content that were uploaded using a particular user-identifier. The instructions further cause the processor to identify, in response to receiving the UUADs, respective approximate upload-times at which the units of content were uploaded, and to ascertain that respective differences between at least some of the approximate upload-times and respective ones of the upload-times are each within a predefined range. The instructions further cause the processor to identify the IP address as a candidate source of the uploaded units of content, in response to the ascertaining. The instructions further cause the processor to associate the particular user-identifier with at least one descriptor that is based on the IP address, in response to identifying the IP address as a candidate source of the uploaded units of content, and to generate an output that indicates the association.

The present disclosure will be more fully understood from the following detailed description of embodiments thereof, taken together with the drawings, in which:

BRIEF DESCRIPTION OF THE DRAWINGS

FIGS. 5A-B are schematic illustrations of a technique for correlating between action-times and approximate action-times, in accordance with some embodiments of the present disclosure;

DETAILED DESCRIPTION OF EMBODIMENTS

Overview

Figure 1:
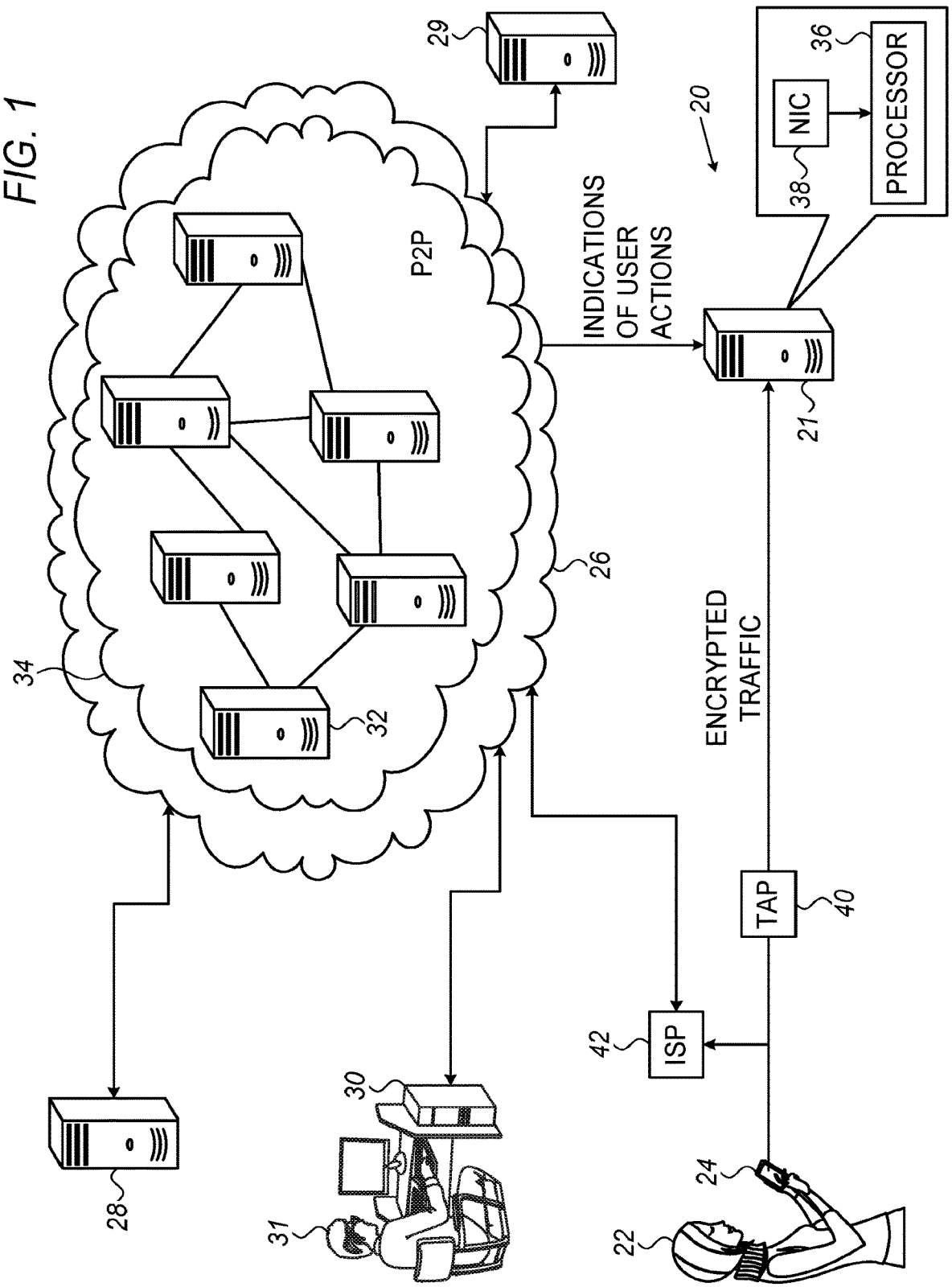
FIG. 1 is a schematic illustration of a system for associating a user-identifier with an Internet Protocol (IP) address, in accordance with some embodiments of the present disclosure.

In some cases, interested parties may wish to identify the user who performed a particular action over a computer network. For example, in response to identifying the uploading of illegal content using an application such as Twitter™, Facebook™, WhatsApp™, or Telegram™, law enforcement agencies may wish to identify the user who uploaded the content. Alternatively, it may be desired to discover a blockchain-specific identifier (e.g., a cryptocurrency address) or an application-specific identifier (e.g., a Twitter™ ID) of a particular user of interest. However, these tasks may be challenging, for at least two reasons.

First, many applications use encrypted communication protocols, such as the Secure Sockets Layer (SSL) protocol and the Transport Layer Security (TLS) protocol. Hence, relevant messages from the user's device—such as a message specifying blockchain transaction details, or a message specifying content of a Twitter™ "tweet"—are typically encrypted.

Second, the user-action details that are shared over the network may not specify the true identities of the users who performed the relevant actions. For example, blockchain transaction details are typically anonymized, in that the details include only the respective blockchain-related identifiers of (i.e., the respective blockchain-related identifiers used by) the transacting users. As another example, certain P2P applications may allow users to share content, and/or information relating to content, anonymously. Similarly, applications such as Twitter™ ay allow users to communicate under application-specific identifiers, without revealing their true identities.

To address this challenge, embodiments of the present disclosure provide a traffic-monitoring system, which monitors the encrypted traffic exchanged between one or more IP addresses, used by one or more devices, and a network, and further receives the user-action details that are passed over the network. By correlating between the times at which the encrypted traffic is exchanged and the times at which the user-action details are received, the system associates the user-action details with the IP addresses. In particular, for each action specified in the user-action details, the system identifies one or more IP addresses that may be the source of the action. Based on the IP addresses, the system may identify one or more users who may have performed the action. Thus, for example, the system may associate a particular Twitter™ ID with the owner of the ID, or a particular cryptocurrency address with the owner of the address.

(In the context of the present application, including the claims, an IP address is described as the "source" of a particular action if the action was performed using a device using the IP address. In the case of an upload of a unit of content, an IP address may be described as the "source" of the uploaded unit of content if the upload was performed using a device using the IP address, even if the user performing the upload did not create the unit of content.)

More specifically, for each flow belonging to the encrypted traffic, the system identifies, if possible, the service with which the flow was exchanged, e.g., based on an (unencrypted) server Internet Protocol (IP) address contained in the flow. For each flow that pertains to a service of interest, the system, even without decrypting the packets in the flow, may identify one or more actions that were performed using the service, along with the respective "action-times" at which the actions were performed. (Each of the actions identified from the encrypted flows is referred to herein as an "encrypted action.")

For example, the system may divide the flow into blocks (or "sequences") of packets, based on the amount of quiet time between successive packets. Next, the system may use a machine-learned classifier to label each block as pertaining to a respective type of user action. For example, using a classifier, the system may ascertain that a particular block of packets pertains to a blockchain transaction, or to a posted Twitter™ tweet. Each labeled block may then be associated with the time at which the block of packets was received by the system. Since the block is generally received by the system almost immediately after the action is performed, this time is considered to be the "action-time" at which the action was performed.

The system further receives, from the network, indications of various user actions that were performed. For example, the system may receive a unit of user-action details (UUAD) that specifies details for a user action that was performed, such as the time and content of a Twitter™ tweet, along with the user-identifier under which the tweet was performed. As another example, for a blockchain transaction, the system may receive a blockchain transaction hash, which indicates that a blockchain transaction was performed. For each such indication relating to an action-type of interest, the system approximates the time at which the indicated action was performed. This "approximate action-time" may be based on the time at which the indication was received by the system, and/or a performance time specified in the UUAD of the indicated action.

Subsequently, the system correlates between the respective action-times of the encrypted actions and the respective approximate action-times of the indicated actions. In particular, given a particular indicated action of interest, the system first identifies those of the action-times that are sufficiently close to the approximate action-time of the indicated action. For example, for an approximate action-time T, the system may identify those action-times that are between times T-L and T-M, where L and M are predetermined durations. The system then hypothesizes that the indicated action may correspond to one of the encrypted actions having these action-times. (In other words, the system hypothesizes that the indication that was received from the network relates to one of the encrypted actions that took place between T-L and T-M.) In response thereto, the system may associate a user-identifier (and/or other information) specified in a UUAD of the indicated action with each of the respective IP addresses that were used to perform the possibly-corresponding encrypted actions.

(It is noted that in the context of the present application, including the claims, a "user-identifier" may refer to any identifier under which user actions are performed by a user, even if this identifier does not reveal the user's true identity.)

Subsequently, the IP addresses associated with the user-identifier may be output by the system. Alternatively, by correlating, with the encrypted actions, other indicated actions that were performed under the same user-identifier, the system may reduce the number of candidate IP addresses, and then output the reduced set of candidates.

Conversely, given an encrypted action performed by a device using an IP address of interest, the system identifies the candidate corresponding indicated actions whose respective approximate action-times are sufficiently close to the action-time of the encrypted action. The respective user-identifiers (and/or other information) specified in the UUADs of the candidate corresponding indicated actions are then output by the system. Alternatively, prior to outputting these user-identifiers, other encrypted actions performed using the same IP address of interest may be used to narrow the list of candidates.

In some embodiments, the system comprises one or more nodes belonging to a P2P network, each of which is configured to receive indications of actions performed on the P2P network. In some such embodiments, the system comprises a large number (e.g., tens or hundreds) of nodes, each of which is connected to a large number of other nodes that do not belong to the system. By virtue of this large number of connections, the relevant indications are received by the system relatively quickly, such that the indicated actions may be more easily associated with the encrypted actions. Alternatively or additionally, to receive the indications more quickly, the nodes belonging to the system may query other nodes for any indications of new actions that were performed, immediately after the identification of an encrypted action performed by a device using an IP address of interest.

For other types of actions that do not involve a P2P network, the system may receive a publicly-available feed that specifies the user-action details, and/or employ a web crawler to gather the details from the Internet.

In some embodiments, the correlating of the indicated actions to the encrypted user actions is based not only on temporal proximity, but also on one or more other factors. One such factor is the sizes of the aforementioned blocks and the sizes of the UUADs of the indicated actions; a larger encrypted block is more likely to correspond to a larger UUAD, relative to a smaller UUAD.

Another such factor is information specified in, or omitted from, the UUADs, which may indicate which services may have been used to perform the indicated actions. For example, different blockchain services may apply different minimum transaction fees, and/or use different types of identifiers for the participants in the transaction. Since, as described above, the system generally identifies the respective service with which each encrypted action was performed, the system may use such information to restrict the number of candidate corresponding encrypted actions for a given indicated action.

Yet another such factor is the respective times at which the indication was received by the nodes belonging to the system. For example, if a node that is relatively close to a first blockchain service but far from a second blockchain service received a particular blockchain transaction hash before another node that is relatively close to the second and far from the first, it is more likely that the indicated blockchain transaction corresponds to an encrypted blockchain transaction that used the first blockchain service, relative to a transaction that used the second blockchain service.

System Description

Reference is initially made to FIG. 1, which is a schematic illustration of a system 20 for associating a user-identifier with an IP address, in accordance with some embodiments of the present disclosure.

FIG. 1 depicts a network 26, such as the Internet, over which various actions, also referred to herein as "user actions," are performed. Network 26 may include a P2P network 34, such as a blockchain network.

FIG. 1 further depicts a user 22 using a device 24, such as a smartphone, to perform user actions over network 26. For example, using an application such as Twitter™ or Telegram™ that runs on device 24, the user may upload content (such as text, images, or video) to an application server 28 that services the application. Alternatively, using an application such as Blockchain Wallet™ or Bitcoin.com Wallet™, or a web service such as Coinbase™, the user may perform a blockchain transaction. (In the context of the present application, including the claims, a blockchain transaction is said to be "performed" following the user's confirmation of the transaction, even if the transaction was not yet validated by the P2P network.)

In response to the performance of each user action, encrypted traffic is exchanged, via network 26, between device 24 and at least one other device. Subsequently to the exchange, the other device may communicate details of the action over network 26.

For example, for a content-uploading action, an encrypted message containing the uploaded content may be communicated, via network 26, from device 24 to server 28. In response to receiving the message, server 28 may communicate the content (typically in an encrypted form), via network 26, to one or more other devices 30 whose users 31 are registered as contacts or followers of user 22 with respect to the application that was used to upload the content. Devices 30 may then decrypt this communication, and show the content to other users 31. Alternatively or additionally, server 28 may post the content to a public feed.

As another example, for a blockchain transaction, an encrypted message containing details of the transaction may be communicated to a blockchain server 29 running a blockchain web service. In response to the message, server 29 may communicate the transaction details to one or more of the nodes 32 belonging to P2P network 34, such that nodes 32 may validate the transaction. Alternatively, the encrypted message may be communicated directly from device 24 to one or more of nodes 32.

System 20 comprises a server 21, comprising a processor 36 and a communication interface, such as a network interface controller (NIC) 38. Via the communication interface, processor 36 monitors the encrypted traffic that is exchanged between multiple devices (such as device 24) of multiple users and network 26. For example, system 20 may comprise at least one network tap 40, which copies each encrypted packet exchanged with the monitored devices, and passes the copy, via NIC 38, to processor 36. Tap 40 may be situated, for example, between the devices and at least one Internet Service Provider (ISP) 42 that services the devices.

Via NIC 38, the processor further receives messages that indicate the performance of user actions. Each such message may contain a single UUAD, and thus relate to a single user action, or multiple UUADs, and thus relate to multiple user actions. Alternatively—as in the case of a blockchain transaction hash—the message may indicate that an action was performed, even without containing details of the action.

For example:

(i) The processor may receive, from any node 32 in the P2P network, a message that includes a blockchain transaction hash, and/or a UUAD specifying details of a blockchain transaction (e.g., a cryptocurrency transaction), including, for example, the respective blockchain addresses of the participants in the transaction.

(ii) The processor may receive a public feed that includes multiple units of uploaded content (such as, for example, multiple Twitter™ tweets, or multiple WhatsApp™ or Telegram™ messages), each unit of content being associated with the user-identifier of the user who uploaded the unit of content.

(iii) Given a particular user-identifier of interest for a particular application (e.g., a particular user ID for Twitter™, Facebook™, WhatsApp™, or Telegram™), the processor may create an account with the application, and then register this account as a contact or follower of the user-identifier of interest. Subsequently, the processor may receive messages that contain respective units of content uploaded by the owner of the user-identifier of interest.

System 20 may further comprise a computer monitor, a microphone, a speaker, and/or any other suitable hardware or software elements configured to facilitate interaction of a user with the system. For example, processor 36 may generate the alphanumeric outputs described herein by displaying these outputs on a computer monitor belonging to the system.

In general, processor 36 may be embodied as a single processor, or as a cooperatively networked or clustered set of processors. Such a cooperatively networked or clustered set of processors may belong, at least partly, to a cloud computing service.

In some embodiments, the functionality of processor 36, as described herein, is implemented solely in hardware, e.g., using one or more Application-Specific Integrated Circuits (ASICs) or Field-Programmable Gate Arrays (FPGAs). In other embodiments, the functionality of processor 36 is implemented at least partly in software. For example, in some embodiments, processor 36 is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Processing the Encrypted Traffic

Figure 2:
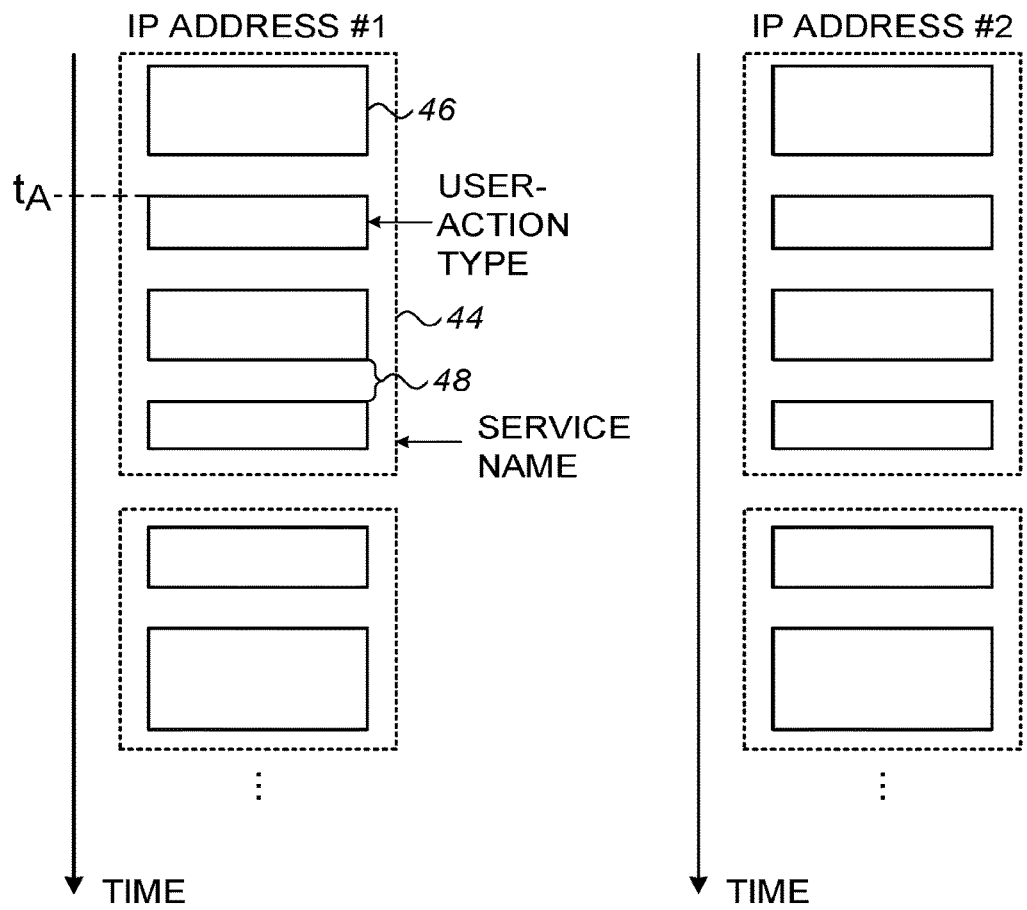
FIG. 2 is a schematic illustration of a technique for processing encrypted traffic, in accordance with some embodiments of the present disclosure.

Reference is now made to FIG. 2, which is a schematic illustration of a technique for processing encrypted traffic, in accordance with some embodiments of the present disclosure.

As described above with reference to FIG. 1, processor 36 monitors the encrypted traffic exchanged between multiple devices and network 26; for example, the processor may receive the encrypted traffic from network tap 40. Subsequently to receiving each encrypted packet, the processor associates the packet with the flow 44 to which the packet belongs. Typically, to perform this association, the processor uses the Internet Protocol (IP) 5-tuple that is specified in the unencrypted header of each packet. That is, packets having the same 5-tuple, or respective 5-tuples that differ from each other only with respect to an interchanging of "source" and "destination," are associated with each other in a single flow.

The processor further groups the flows by the IP addresses specified in the aforementioned 5-tuples. The processor may thus obtain, as illustrated in FIG. 2, multiple sequences of one or more flows, the sequences being associated with different respective IP addresses.

In some embodiments, the processor may link (or "map") one or more of the IP addresses to other identifiers, which are referred to herein as "IP-address-linked identifiers." Advantageously, in such embodiments, even if a device changes its IP address (or, in some cases, even if the user changes the device that he uses), multiple IP addresses—and hence, multiple sequences of flows—may be grouped together under the same IP-address-linked identifier.

One type of IP-address-linked identifier is a device-identifier of the device that used the IP address. Examples of this type of IP-address-linked identifier include a Mobile Station International Subscriber Directory Number (MSISDN), an International Mobile Subscriber Identity (IMSI), and an International Mobile Equipment Identity (IMEI), each of which may be mapped to the IP address by tapping Remote Authentication Dial-In User Service (RADIUS) or General Packet Radio Service (GPRS) Tunneling Protocol (GTP) traffic. (It is noted that in the context of the present application, including the claims, a device-identifier is said to identify a device even if the device-identifier identifies only a removable component of the device, such as a subscriber identity module (SIM) of the device.)

Another type of IP-address-linked identifier is an account-identifier of the account to which the IP address was provisioned. One example of this type of IP-address-linked identifier is a RADIUS username, which may be mapped to the IP address by tapping RADIUS traffic.

Yet another type of IP-address-linked identifier is an attribute of the user who used the IP address, such as the name, phone number, address, or login credentials of the user. This type of IP-address-linked identifier may be obtained, for example, by querying a database belonging to ISP 42 (FIG. 1).

For at least some of the flows, the processor further identifies the service that was used to generate the flow. For example, the processor may identify (e.g., in the first packet belonging to the flow) a destination IP address that is known a priori to be used by a particular service. If the destination IP address is not recognized, the processor may identify the service that uses the destination IP address based on a Domain Name System (DNS) request originating from the IP address and occurring immediately prior to the flow. Alternatively or additionally, other fields contained in the flow, such as a port number or a Transport Layer Security (TLS) header item (e.g., a Common Name) may be used to identify the service. Optionally, as illustrated in FIG. 2, the processor may label the flow with the name of the service.

Next, given each flow 44 that pertains to a service of interest, the processor, without decrypting the flow, may identify one or more encrypted actions, along with the respective action-times at which the encrypted actions were performed.

In some embodiments, the processor identifies the encrypted actions by first separating the flow into a sequence of blocks 46 of packets, based on the quiet time 48 between successive blocks. In other words, successive packets that are separated in time by more than a threshold duration of quiet time are assigned to different respective blocks. Each block may include any number of uploaded packets and/or any number of downloaded packets.

Subsequently to defining the blocks, the processor identifies one or more blocks in the flow that were generated responsively to user actions, and further identifies the respective types of these actions. For example, the processor may ascertain that a particular block corresponds to (i.e., was generated responsively to) the performance of a blockchain transaction, or to the uploading of content. Typically, as illustrated in FIG. 2, the processor labels the block with the type of user action to which the block corresponds; hence, the process of identifying the user-action type to which the block corresponds is referred to herein as "labeling" the block.

In general, the labeling of each block may be based on any suitable features of the block. Examples of such features are (i) the amount of time between the receipt of successive packets in the block, (ii) the absolute sizes of the packets, or the sizes of the packets relative to each other, and (iii) the respective directionalities of the packets, i.e., whether each packet was uploaded or downloaded. Another example is the ratio of the number, or total size of, the uploaded packets to the number, or total size of, the downloaded packets.

Typically, prior to labeling the blocks, the processor trains a classifier configured to perform the labeling based on features of the blocks. (Typically, a separate classifier is trained for each service.) Subsequently, the classifier is used to label the blocks.

To train the classifier, any suitable machine-learning techniques may be used. For example, the classifier may be trained on a labeled training set, in which a large number of encrypted blocks are labeled with the user-action types to which the blocks correspond. Any suitable supervised learning algorithm, such as, for example, XGBoost or the Random Forest algorithm, may be used for this purpose.

For example, as described in Israel application 260,986, whose disclosure is incorporated herein by reference, processor 36 (or another processor belonging to system 20) may automatically, using the service, perform a large number of user actions of various types, and record, in a log, the respective times at which the actions were performed. The encrypted packets that are generated responsively to each action may be received via a network tap. Subsequently, by correlating between the times in the log and the times at which the encrypted packets were received, the processor may match each of the user actions with a corresponding block of packets, which is assumed to have been generated by the user action. The processor may thus automatically build a large, labeled training set, which may be used to train a classifier using a suitable supervised learning algorithm.

As further described in Israel application 260,986, the building of the training set and the training of the classifier may be performed iteratively, whereby the classifier may be used to label additional samples for the training set, and then the augmented training set may be used to retrain the classifier.

Alternatively or additionally, as described in US Patent Application Publication 2018/0109542, whose disclosure is incorporated herein by reference, a "man-in-the-middle" (MITM) device may intermediate the exchange of encrypted communication between at least one human or automated user and the service. In other words, each packet that passes between the user and the service may be decrypted and then re-encrypted by the MITM. Processor 36 (or another processor belonging to the system) may thus obtain, for each action performed by the user, two corresponding blocks of packets: an encrypted block, and an unencrypted block that indicates the type of action. The correspondence between the encrypted blocks and the unencrypted blocks may be used to automatically build a labeled training set, which may then be used to train the classifier.

In the event that a classifier is needed for multiple different runtime environments, or multiple different versions of a runtime environment, transfer-learning techniques may be used to generate the necessary training sets, as described, for example, in US Patent Application Publication 2018/0260705, whose disclosure is incorporated herein by reference.

Following (or during) the labeling of each block, the processor identifies the action-time $t_A$ at which the user performed the action to which the block corresponds. For actions in which content was uploaded, $t_A$ may also be referred to herein as an "upload-time."

Typically, for any given packet, the delay between the generation of the packet and the receipt of the packet by tap 40 (FIG. 1) is negligible. Hence, the time at which one of packets in the block—e.g., the first packet in the block—was received by tap 40 (or by the processor) is identified as the action-time of the block.

In other embodiments, the processor uses a classifier that processes the flow as a stream of packets, rather than as a sequence of predefined blocks. The classifier—which may include, for example, a convolutional neural network (CNN) or a recursive neural network (RNN)—both identifies and labels the blocks that correspond to respective encrypted actions. The identification and labeling of the blocks may be based on any suitable features of the packets in the flow, such as any of the features described above. In such embodiments, the classifier need not necessarily output the block corresponding to each encrypted action that was identified; rather, the classifier may simply output the type and action-time of each identified encrypted action.

Receiving Indications of User Actions

As described above with reference to FIG. 1, processor 36 receives, from network 26, messages that indicate the performance of various user actions. The receipt of these messages is hereby described in more detail with reference to FIGS. 3-4, whereby FIG. 3 relates to the receipt of these messages from P2P network 34 (FIG. 1), while FIG. 4 relates to other cases.

Figure 3:
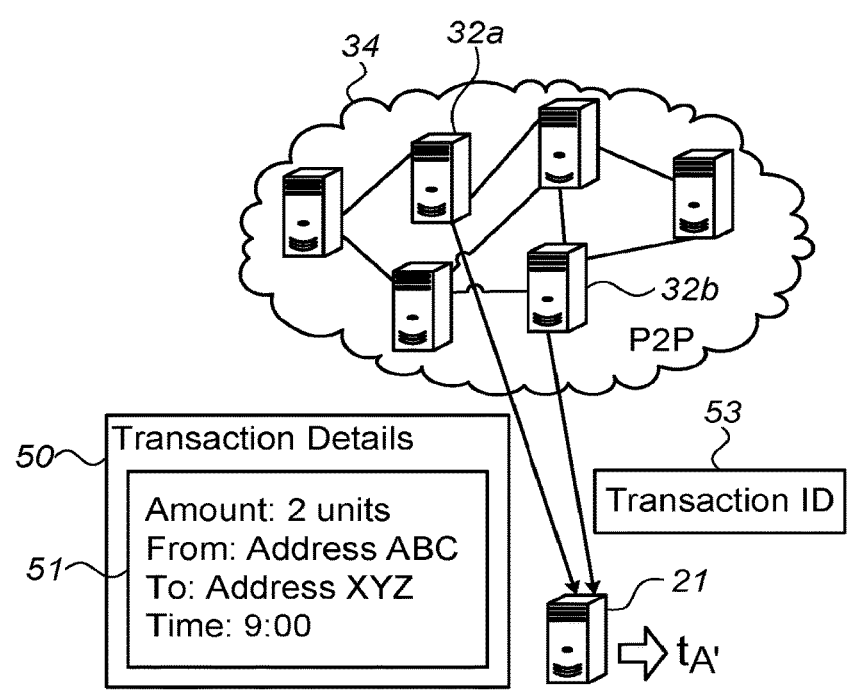
FIG. 3 is a schematic illustration of the receipt of user-action-indicating messages from a P2P network, in accordance with some embodiments of the present disclosure.

First, reference is made to FIG. 3, which is a schematic illustration of the receipt of user-action-indicating messages from P2P network 34, in accordance with some embodiments of the present disclosure. (For simplicity, FIG. 3 shows P2P network 34, but omits the rest of network 26.)

In response to any relevant type of user action, a UUAD-containing message 50, whose content includes a UUAD 51 specifying details of the action, may be passed between the nodes in P2P network 34. For a blockchain transaction, UUAD 51 may specify details of the transaction, such as an amount of an asset (e.g., a number of units of cryptocurrency) that was transferred, the address from which the asset was transferred, the address to which the asset was transferred, and, in some cases, the time at which the transaction was performed.

In some cases, for a blockchain transaction, each node that is informed of the transaction first forwards a blockchain-hash-containing message 53 to at least some of its peers, i.e., to at least some of the nodes to which the node is connected. (In FIG. 3, the hash is referred to as a "Transaction ID," given that the hash uniquely identifies the transaction.) In response to receiving the hash, each peer may request the corresponding UUAD 51 from the forwarding node. In response thereto, the forwarding node may forward the UUAD to the requesting peer.

Typically, one or more nodes (typically, a large number of nodes) in P2P network 34 belong to system 20, each of these nodes comprising a processor and a communication interface, such as a NIC. (In some embodiments, server 21 is collocated with one of the nodes belonging to system 20.) Each node belonging to system 20 may pass any received UUADs to server 21, and hence, to processor 36. (The node may encrypt the UUAD, prior to passing the UUAD to the server.) Alternatively, for a blockchain transaction, each node may pass the transaction hash to server 21, without necessarily passing the corresponding UUAD. In such embodiments, a single, designated node may pass the UUAD to the server for each transaction. Alternatively, the server, in response to receiving the transaction hash, may request the UUAD of the transaction from any one of the nodes.

For example, as illustrated in FIG. 3, a first node 32a, which belongs to system 20, may receive a blockchain transaction hash. In response to receiving the hash, first node 32a may request the transaction details, and then, after receiving the details, forward the details to the processor. Subsequently, a second node 32b may receive the hash, and, in response thereto, forward the hash to the processor. Subsequently, as the hash continues to propagate through the P2P network, the processor may continue to receive the hash (and/or the corresponding UUAD) from other nodes belonging to system 20.

In response to receiving, from at least one node in the P2P network, an indication that an action was performed, the processor identifies an approximate action-time $t_{A'}$ of the indicated action. In some cases, the approximate action-time is the time at which the indication was first received by system 20, i.e., the time at which the indication was received by the first one of the nodes belonging to the system to receive the indication. (For example, for a blockchain transaction, $t_{A'}$ may be the time at which the system first received the hash of the transaction.) In other cases, $t_{A'}$ may be the time that is indicated in the UUAD of the indicated action (e.g., 9:00 for the example in FIG. 3).

Figure 4:
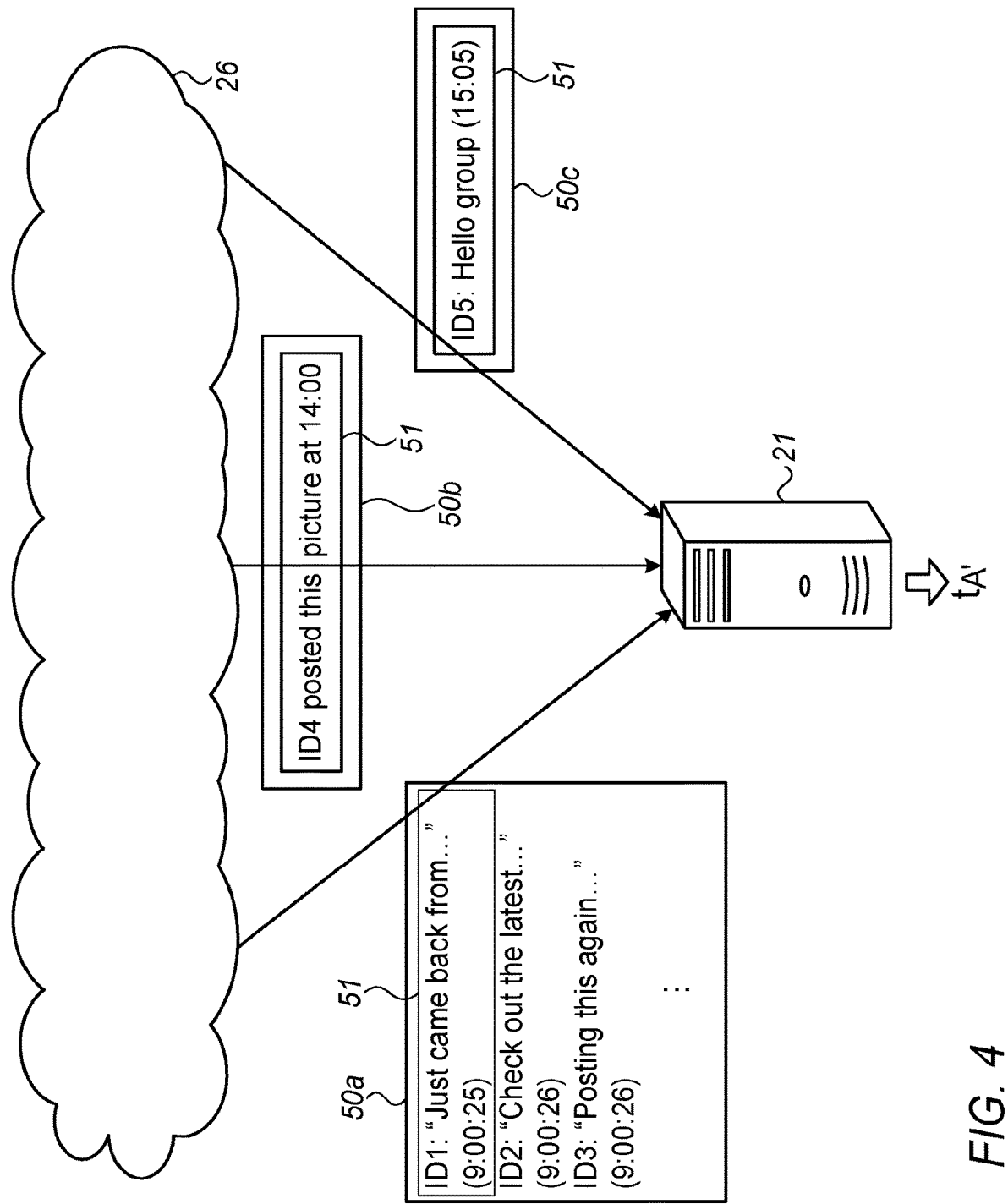
FIG. 4 is a schematic illustration of the receipt of user-action details from a network, in accordance with some embodiments of the present disclosure.

Reference is now made to FIG. 4, which is a schematic illustration of the receipt of UUADs from network 26, in accordance with some embodiments of the present disclosure.

Using various techniques, the processor may receive various types of messages indicating that content was uploaded via network 26. Each such message includes one or more UUADs, each UUAD specifying an uploaded unit of content in association with the user-identifier that was used to upload the unit of content. (In FIG. 4, some hypothetical user-identifiers are specified using the notation ID1 . . . ID5.)

For example, the processor may receive a public feed 50a of uploaded content, e.g., by downloading public feed 50a from the relevant service or from a third party. Public feed 50a may include multiple UUADs specifying respective units of content that were uploaded within a particular period of time (e.g., during the previous 24 hours), along with (i) the respective user-identifiers under which the units of content were uploaded, and (ii) the respective times at which the units of content were uploaded.

Alternatively or additionally, the processor may receive, from a network crawler, messages 50b, each containing at least one UUAD relating to content that was found on the network.

In some cases, given a particular user-identifier of interest, the processor may create a user account, and register the user account to a group of user accounts associated with the user-identifier of interest, such as a public instant messaging group. Subsequently, the processor, via the user account, may receive messages 50c that are communicated from the user-identifier of interest to the group. Each message 50c may include, for example, a UUAD analogous to the UUADs described above with reference to public feed 50a. (Although messages 50c may be encrypted, the processor may decrypt these messages, by virtue of being a member of the group and hence, an intended recipient of the messages.) In response to receiving the UUADs, the processor identifies respective approximate upload-times $t_{A'}$ at which the units of content specified in the UUADs were uploaded. The approximate upload-time of any particular UUAD may be the time at which the UUAD was received by the processor, or the time that is indicated in the UUAD as the upload-time of the unit of content.

Correlating Between the Action-Times and the Approximate Action-Times

Reference is now made to FIGS. 5A-B, which are schematic illustrations of a technique for correlating between the action-times of the encrypted actions and the approximate action-times of the indicated actions, in accordance with some embodiments of the present disclosure.

By way of introduction, FIG. 5A relates to a case in which the processor has received an indication that a particular user action of interest was performed. For example, the processor may have received a UUAD indicating the performance of a suspicious blockchain transaction or the uploading of illegal content. As another example, the processor may have received a UUAD indicating that a user action was performed under a user-identifier of interest, such as a user-identifier that is known to have been involved in problematic online activity. In such a case, the processor processes the encrypted traffic so as to identify any encrypted actions that may correspond to the indicated action of interest.

Conversely, FIG. 5B relates to a case in which the processor has identified an encrypted action that was performed at a particular IP address (IPA) of interest, i.e., that was performed by any device using the IP address of interest. Given this encrypted action, the processor processes the indicated actions so as to identify any indicated actions that may correspond to the encrypted action.

More specifically, in FIG. 5A, given the approximate action-time $t_{A'}$ at which the indicated action of interest was performed, the processor identifies each action-time that is sufficiently close to $t_{A'}$. Each such action-time is referred to herein as a candidate corresponding (or "matching") action-time for $t_{A'}$, for the indicated action, or for the UUAD of the indicated action. Similarly, the encrypted action performed at the action-time is referred to herein as a candidate corresponding (or "matching") encrypted action, and the respective IP address at which each candidate corresponding encrypted action was performed is referred to herein as a candidate source of the indicated action.

In general, a given action-time is considered to be sufficiently close to $t_{A'}$ if the difference between $t_{A'}$ and the action-time is within a predefined range. For example, FIG. 5A assumes a predefined range [M, L] for two positive time-offsets M and L, in that any action-time within a time window 52 beginning at $t_{A'}$-L and ending at $t_{A'}$-M is deemed to be sufficiently close to $t_{A'}$, and hence, a candidate corresponding action-time. FIG. 5A further shows six action-times $t_{A\_1} \ldots t_{A\_6}$, four of which ($t_{A\_3}$, $t_{A\_4}$, $t_{A\_5}$, and $t_{A\_6}$) fall within time window 52. In this case, the processor may identify $t_{A\_3} \ldots t_{A\_6}$ as candidate corresponding action-times for $t_{A'}$.

As noted above, the lower limit of the example range above, M, is positive, indicating that the approximate action-time is assumed to be greater than any candidate corresponding action-time. Such an assumption applies, for example, to cases in which the approximate action-time is the time at which the indication of the action was first received by system 20. In other cases, the lower limit of the range may be negative, such that time window 52 includes some times that are greater than $t_{A'}$. For example, the lower limit may be negative if the approximate action-time is the time of the indicated action as specified in the UUAD of the indicated action, which, due to lack of precision, may be less than or greater than the time at which the action actually occurred. As further described below with reference to FIG. 6, the upper and/or lower limit of the range may be different for different times of day, and/or for different network conditions.

Conversely, in FIG. 5B, given an action-time $t_A$ at which an encrypted action was performed at the IP address of interest, the processor identifies the candidate corresponding (or "matching") approximate action-times that fall within window 52. The respective indicated action to which each of the candidate corresponding approximate action-times belong is referred to herein as a candidate corresponding (or "matching") indicated action.

Analogously to FIG. 5A, FIG. 5B shows window 52 beginning at $t_A$+M and ending at $t_A$+L. (As described above, in some cases, M may be negative.) In the example shown in FIG. 5B, the approximate action-times $t_{A'\_1}$, $t_{A'\_2}$, $t_{A'\_3}$, and $t_{A'\_4}$ are within window 52; hence, the processor may identify the IP address of interest as a candidate source of each of the indicated actions having respective approximate action-times of $t_{A'\_1}$, $t_{A'\_2}$, $t_{A'\_3}$, and $t_{A'\_4}$.

In some embodiments, the processor computes a likelihood of correspondence for each candidate match. For example, with reference to the example shown in FIG. 5B, the processor may, for each of the four approximate action-times that fall within window 52, compute a respective likelihood that $t_A$ corresponds to the approximate action-time. Various factors that may contribute to the likelihood of correspondence are described below. As further described below, based on the likelihoods of correspondence, the processor may compute respective levels of confidence for associating, with the IP address of interest, the respective user-identifiers specified in the UUADs of the candidate corresponding indicated actions.

As described above in the Overview, in some embodiments, in response to identifying, from the encrypted traffic, that an encrypted user action involving P2P network 34 was performed at an IP address of interest, the nodes belonging to system 20 query other nodes in the P2P network for any indications of new actions. The indication corresponding to the encrypted action may then be received by one of the nodes belonging to the system, in response to the querying. Advantageously, by virtue of accelerating the receipt of the indications in this manner, a smaller window 52 may be used, such that the number of candidate matches is reduced.

In some embodiments, prior to correlating between the action-times and the approximate action-times, the processor learns the distribution, at any suitable level of precision, for the difference $\Delta T$ between the approximate action-time and the action-time of any given user action. Subsequently, the limits M and L, which determine the start and end times of window 52, may be derived from the distribution. For example, the processor may set M and L responsively to a given threshold percentage of $\Delta T$ values being between M and L. Typically, the threshold percentage that is chosen is relatively close to 100% (e.g., 98% or 99%).

Additionally, based on the distribution, the processor may compute the aforementioned likelihood of correspondence. For example, referring again to FIG. 5A, the processor may learn that $\Delta T$ is more likely to be closer to M than to be farther from M. In response thereto, the processor may compute a higher likelihood for a match between $t_{A'}$ and $t_{A\_6}$, relative to any of the other action-times in window 52.

In some cases, the distribution of $\Delta T$ may vary with the service that is used to perform the action. For example, $\Delta T$ tends to be larger for Bitcoin transactions that are performed via a web service, relative to Bitcoin transactions that are performed directly with a node in P2P network 34. Furthermore, the distribution of $\Delta T$ may vary with the type of action that is performed. Hence, the processor (or another processor belonging to system 20) typically learns a separate distribution of $\Delta T$ for each service and for each action-type of interest.

Figure 6:
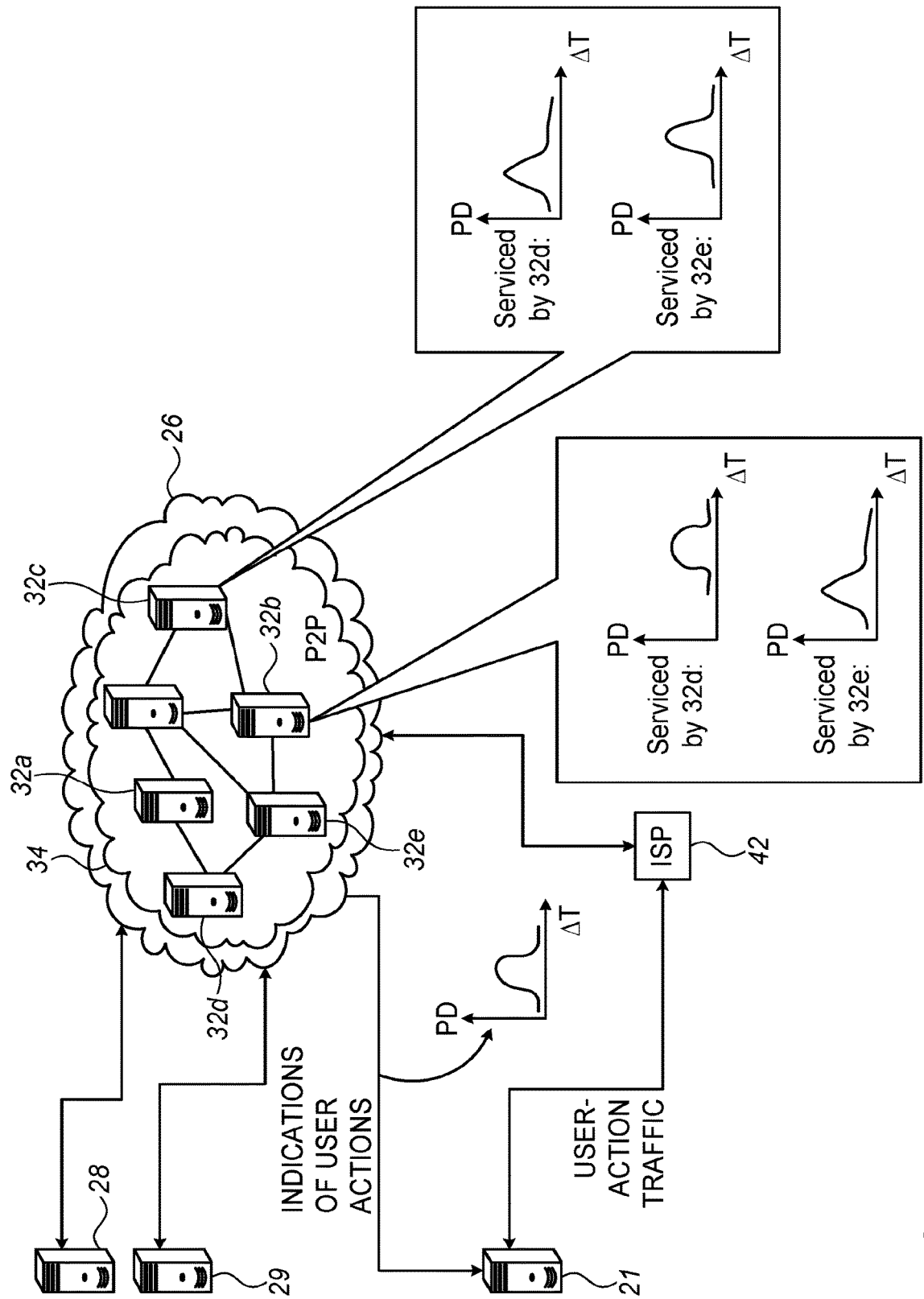
FIG. 6 is a schematic illustration of a learning technique for facilitating correlating between action-times and approximate action-times, in accordance with some embodiments of the present disclosure.

In this regard, reference is now made to FIG. 6, which is a schematic illustration of a learning technique for facilitating correlating between the action-times and the approximate action-times, in accordance with some embodiments of the present disclosure.

To learn the distribution of $\Delta T$ for a particular service and action-type, the processor (or a different processor belonging to system 20) uses the service to perform a large number of user actions of the action-type. For each of these user actions, the processor receives the indication of the action from network 26. (In some embodiments, subsequently to the performance of the action, the nodes belonging to system 20 query other nodes for any indications of new actions, as described above with reference to FIG. 5B, such that the receipt of the indication is expedited.) In response to receiving the indication, the processor computes the approximate action-time $t_{A'}$ for the action. The processor then calculates the difference $\Delta T$ between $t_{A'}$ and the time $t_A$ at which the action was performed. (Given that, in this case, the processor is the "user" performing the actions, the processor can readily identify the user action to which each received indication relates.) Based on all of the calculated differences, the processor constructs a probability density function (PDF) (or normalized histogram), which returns a respective probability density (PD) for any given value of $\Delta T$.

In some embodiments, the processor constructs multiple PDFs, corresponding to different respective services, for each node belonging to system 20. Each PDF uses, for the approximate action-time, the time at which the node first received the indication. For example, for blockchain transactions, each PDF may use the time at which the node first received the transaction hash.

Subsequently, for any given indicated action whose corresponding encrypted action is unknown (as in FIG. 5A), the processor notes the respective receipt-times at which the indication was first received by all of the nodes belonging to the system. The processor may then, based on the receipt-times and the PDFs, ascertain that one encrypted action is more likely to correspond to the indicated action than another encrypted action, provided that the two encrypted actions were performed using different respective services.

By way of example, FIG. 6 shows two hypothetical PDFs for each of second node 32b and a third node 32c, each of which is assumed to belong to system 20: one PDF for instances in which a blockchain transaction is performed using a service residing on a fourth node 32d, and another for instances in which a blockchain transaction is performed using a service residing on a fifth node 32e. Per the hypothetical PDFs, when fourth node 32d services the transaction, it is more probable that third node 32c receives the transaction hash before second node 32b, relative to the reverse. Conversely, when fifth node 32e services the transaction, it is more probable that second node 32b receives the transaction hash before third node 32c, relative to the reverse. Consequently, for a transaction hash that is received by third node 32c before second node 32b, the processor may calculate a greater likelihood of correspondence to an encrypted transaction that was performed using fourth node 32d, relative to an encrypted transaction that was performed using fifth node 32e. Conversely, for a transaction hash that is received by second node 32b before third node 32c, the processor may calculate a greater likelihood of correspondence to an encrypted transaction performed using fifth node 32e, relative to an encrypted transaction performed using fourth node 32d.

In some embodiments, the processor constructs different PDFs for different times of day, and/or for different network conditions. Thus, for example, window 52 (FIGS. 5A-B) may be smaller for periods of time that experience less network congestion than for periods of time that experience more network congestion.

In some embodiments, the nodes belonging to system 20 do not forward blockchain transaction hashes to other nodes. By virtue of not forwarding the hashes, each node belonging to the system may receive each hash, at a sequence of receipt-times, from a large number of other nodes in the P2P blockchain network. Based on the respective sequences of receipt-times at which the hash was received by the nodes belonging to the system, the processor may ascertain that the indicated action is more likely to have been performed using a first service, relative to a second service. (In performing this function, the processor may use any of the techniques described in Fanti et al., "Anonymity properties of the bitcoin p2p network, arXiv preprint arXiv:1703.08761 (2017)," which is incorporated herein by reference; for example, the processor may use a maximum-likelihood estimator as described therein.) The processor may therefore calculate a greater likelihood of correspondence to an encrypted transaction performed using the first service, relative to an encrypted transaction performed using the second service.

In some embodiments, the processor computes the likelihoods of correspondence based on the sizes of the UUADs and of the encrypted blocks, alternatively or additionally to the receipt-times at which the indications were received. In this regard, reference is now made to FIG. 7, which is a schematic illustration of a technique for learning a correlation between the sizes of encrypted blocks and the sizes of corresponding UUADs, in accordance with some embodiments of the present disclosure.

Figure 7:
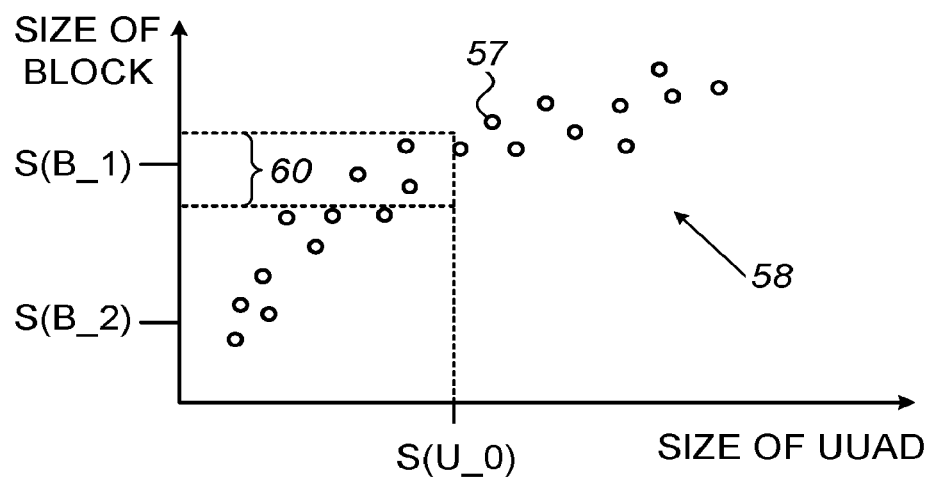
FIG. 7 is a schematic illustration of a technique for learning a correlation between the sizes of encrypted blocks and the sizes of corresponding units of user-action details, in accordance with some embodiments of the present disclosure.

Per the technique illustrated in FIG. 7, the processor (or another processor belonging to the system) performs multiple user actions that are of the same general type (as described above with reference to FIG. 6), but which vary with respect to the particulars of the action. Due to this variance, the actions generate encrypted blocks, and UUADs, of varying sizes.

For example, the processor may perform various blockchain transactions that differ from each other with respect to the number of inputs and/or the number of outputs in the transaction. (To vary the number of inputs in a cryptocurrency transaction, the processor may first receive small amounts of cryptocurrency at different respective addresses, and then use various subsets of these addresses as inputs for subsequent transactions.) For each of the transactions, the processor may record a data point 57 that includes two numbers, each of which generally varies as a function of the number of inputs and outputs: the size of the UUAD (specified in bytes, for example), and the size of the corresponding encrypted block. Alternatively, for example, the processor may upload units of content of varying sizes (e.g., text messages of varying lengths), and, for each such upload, record a data point 57 that includes both the size of the UUAD (or of the unit of content itself) and the size of the corresponding encrypted block.

The processor may thus obtain a scatter plot 58, which plots the block size and the UUAD size against each other. Subsequently, the processor may use any suitable machine-learning tool, such as a Support Vector Machine (SVM), to learn the correlation between the block sizes and the UUAD sizes. For example, the SVM may learn an expected range 60 of block sizes for any given UUAD size, and, conversely, an expected range of UUAD sizes for any given block size.

Subsequently, given multiple candidate corresponding encrypted blocks for a given indicated action (as in FIG. 5A), the processor may, based on the learning that was performed, for each candidate corresponding block, identify a degree of correlation between the block-size of the candidate corresponding block and the UUAD-size of the UUAD of the indicated action. The processor may then calculate a likelihood of correspondence for each of the candidates, in response to the degree of correlation for the candidate. Similarly, given multiple candidate corresponding indicated actions for a given encrypted block (as in FIG. 5B), the processor may, for each of the candidate corresponding indicated actions, identify a degree of correlation between the block-size of the block and the UUAD-size of the UUAD of the indicated action, and then calculate a likelihood of correspondence in response to the degree of correlation.

For example, as shown in FIG. 7, the processor may receive a UUAD of interest "U_0" having a size S(U_0). Subsequently, using the techniques described above with reference to FIG. 5A, the processor may identify two candidate corresponding blocks for this UUAD: a first block B_1 having a size S(B_1), and a second block B_2 having a size S(B_2). Subsequently, the processor may ascertain that S(B_1) lies within the expected range 60 for S(U_0), whereas S(B_2) does not. In response thereto, the processor may compute a higher likelihood of correspondence to B_1, relative to B_2.

Alternatively or additionally, the processor may identify particular information that is included in a UUAD, and use this information to compute a likelihood of correspondence to a given encrypted action. Alternatively or additionally, the processor may ascertain that the UUAD omits particular information, and compute the likelihood based on this omission. In some cases, the inclusion or omission of particular information may be used to rule out a correspondence entirely (i.e., to compute a likelihood of correspondence of zero).

For example, the processor may identify an indication in the UUAD that the UUAD was generated by a particular service (or at least by a particular group of services). For example, the processor may identify a type of blockchain transaction fee, or a type of user-identifier, that is unique to the particular service. In response thereto, the processor may identify a possible correspondence between the UUAD and a particular encrypted action that was performed with the particular service, while rejecting a possible correspondence with another encrypted action that was performed with a different service.

In some embodiments, the processor labels the encrypted actions probabilistically, in that the processor may assign, to a single encrypted action, multiple labels with respective associated probabilities. For example, an encrypted action may be assigned a 70% probability of being a blockchain transaction, and a 30% probability of being a different type of action. In such embodiments, the probabilities of the labels may be used to compute the likelihoods of correspondence.

For example, supposing that encrypted actions A_1 and A_2 are candidate matches for an indicated blockchain transaction, and that A_2 has a higher probability of being a blockchain transaction than does A_1, the processor may compute a higher likelihood for a correspondence between the indicated transaction and A_2, relative to A_1.

In some embodiments, the processor constructs a multidimensional PDF, whose various dimensions correspond to variables such as $\Delta T$, the respective sizes of the encrypted block and of the UUAD, and the probability of the label. The processor then uses this multidimensional PDF to compute the likelihood of correspondence between any given encrypted action and any given indicated action. Alternatively, to compute the likelihood of correspondence, the processor may use a Bayesian network in which the priors include variables such as the service that is used and the encrypted block size, and the observed data include variables such as the UUAD size and $\Delta T$.

Outputting the Association

In response to identifying an IP address as a candidate source of an indicated action, the processor may associate information relating to the indicated action with at least one descriptor that is based on the IP address. The information relating to the indicated action is typically derived from the UUAD of the indicated action; for example, the information may include a blockchain address or other user-identifier specified in the UUAD. The descriptor may include the IP address itself; for example, the descriptor may consist of the IP address. Alternatively or additionally to including the IP address, the descriptor may include an IP-address-linked identifier, such as a RADIUS username, an MSISDN, or an IMSI. (IP-address-linked identifiers may be linked to the IP address as described above with reference to FIG. 2.)

For example, in the case shown in FIG. 5A, the processor may associate information relating to the indicated action of interest with each of the IP addresses (IPA_1, IPA_2, IPA_3, and IPA_4) at which the four encrypted actions having the respective action-times $t_{4\_3} \ldots t_{4\_6}$ were performed, respectively. As another example, in the case shown in FIG. 5B, the processor may associate the IP address of interest with each of the user-identifiers (ID_1, ID_2, ID_3, and ID_4) under which the indicated actions having approximate action-times $t_{4'\_1} \ldots t_{4'\_4}$ were performed, respectively.

Subsequently to associating the information with the descriptor, the processor may generate an output that indicates the association. For example, referring again to FIG. 5A, and supposing that (i) the indicated action of interest was a blockchain transaction performed using the blockchain address "XYZ," and (ii) respective encrypted blockchain transactions were performed at IPA_1, IPA_2, IPA_3, and IPA_4 at the action-times $t_{4\_3} \ldots t_{4\_6}$, the processor may generate an alphanumeric output that states the blockchain address XYZ, followed by IPA_1, IPA_2, IPA_3, and IPA_4. As another example, supposing that (i) the indicated action of interest was a tweet performed using the Twitter™ ID "ABC," and (ii) respective encrypted tweets were performed at IPA_1, IPA_2, IPA_3, and IPA_4 at the action-times $t_{4\_3} \ldots t_{4\_6}$, the processor may generate an alphanumeric output that states the Twitter™ ID ABC, followed by IPA_1, IPA_2, IPA_3, and IPA_4. As yet another example, referring again to FIG. 5B, and supposing that (i) an encrypted blockchain transaction was performed at the IP address of interest at $t_4$, and (ii) four indicated blockchain transactions have approximate action-times $t_{4'\_1} \ldots t_{4'\_4}$, the processor may generate an alphanumeric output that states the IP address of interest, followed by ID_1, ID_2, ID_3, and ID_4.

In practice, particularly for popular applications such as Twitter™ and Facebook™, window 52 may include a large number of candidate matches. Hence, prior to generating the output, the processor typically collects a large number of encrypted actions and indicated actions over a period of time, grouping IP addresses together, wherever possible, as described above with reference to FIG. 2. Based on these data, the processor may obtain a relatively small number of candidate descriptors (i.e., IP addresses and/or IP-address-linked identifiers) for any particular user-identifier of interest, or a relatively small number of candidate user-identifiers for any particular descriptor of interest. The processor then generates an output that specifies the final set of candidates.

In some embodiments, the processor generates the final set of candidates using a method referred to hereinbelow as the "intersection method." Per this method, the processor may process multiple indicated actions performed under the same user-identifier of interest, and then output the intersection of the respective sets of candidate descriptors for the indicated actions. Conversely, the processor may process multiple encrypted actions performed at the same IP address of interest (or at the same group of IP addresses mapped to a single IP-address-linked identifier), and then output the intersection of the respective sets of candidate user-identifiers for the encrypted actions.

For example, after identifying an initial set of candidate source IP addresses for a first indicated action, the processor may receive, from any node in the P2P network, an indication that another action was performed under the same user-identifier as was the first indicated action. (This other action may not necessarily be of the same type, and may not necessarily use the same service, as the first action.) In response to receiving the indication of the other action, the processor may identify the approximate action-time of the other action. Based on this approximate action-time, the processor may ascertain that one or more of the candidate source IP addresses was not the source of the other action, given that none of these IP addresses has an action-time sufficiently close to approximate action-time of the other action. In response thereto, the processor may dissociate the user-identifier from each of these candidate source IP addresses.

By way of illustration, continuing the first of the examples above in which IPA_1, IPA_2, IPA_3, and IPA_4 are initial candidates for a blockchain address XYZ, the processor may correlate several additional indicated actions with the encrypted actions, and thus obtain the sets of candidates shown in Table 1 below.

TABLE 1

| INDICATED ACTION USING BLOCKCHAIN ADDRESS XYZ | Candidate Source IP addresses |
|---|---|
| A_1 | IPA_1, IPA_2, IPA_4, IPA_5 |
| A_2 | IPA_1, IPA_4, IPA_5 |
| A_3 | IPA_4, IPA_6 |

Given these sets of candidates, the processor may identify IPA_4 as the source of the actions using the blockchain address XYZ, given that IPA_4 is the only IP address appearing as a candidate for each of the indicated actions, i.e., given that the intersection of the sets of candidates includes only IPA_4. In other words, responsively to receiving A1, A_2, and A_3, the blockchain address XYZ may be dissociated from each of IPA_1, IPA_2, and IPA_3, given that each of these IP addresses was not the source of at least one of A_2, A_3, and A_4.

Similarly, continuing the second of the examples above in which IPA_1, IPA_2, IPA_3, and IPA_4 are initial candidates for a Twitter™ ID ABC, the processor may identify, based on other received UUADs, other approximate upload-times at which other units of content were uploaded using the Twitter™ ID ABC. Based on the other approximate upload-times, the processor may ascertain that the other units of content were not uploaded from (for example) IPA_2, IPA_3, or IPA_4. Responsively thereto, the processor may dissociate the Twitter™ ID ABC from each of IPA_2, IPA_3, and IPA_4.

Alternatively or additionally to utilizing the intersection method, the processor may generate the final set of candidates by computing a level of confidence (or "score") for each association, and then generating the output in response to the levels of confidence. For example, the output may indicate only those associations having the highest levels of confidence, and/or only those associations whose respective levels of confidence are greater than a predefined threshold. (The output may specify the level of confidence for each association.)

In some embodiments, the processor computes each level of confidence based on the above-described likelihoods of correspondence. For example, referring again to the example above, with reference to FIG. 5A, in which $t_{4\_6}$ was deemed to be the most likely match to $t_A$, the processor may compute a higher level of confidence for the association with IPA_4, relative to IPA_1, IPA_2, or IPA_3.

Alternatively, to compute the level of confidence for each association, the processor may first calculate an upper bound U on the likelihood that the IP address (or group of IP addresses mapped to a single IP-address-linked identifier) was not the source of the indicated actions. For example, for actions involving the uploading of content, the processor may calculate an upper bound U on the likelihood that the IP address was not the source of the uploaded units of content. Subsequently, the processor may compute the level of confidence as a decreasing function of U.

For example, to identify one or more candidate source IP addresses (and/or candidate groups of source IP addresses), with respective levels of confidence, for a particular user-identifier, the processor may first collect, over a period of time, a set of N UUADs that specify the user-identifier. Next, for each of the N UUADs, the processor may identify the candidate source IP addresses for the UUAD, as described above with reference to FIG. 5A. For each IP address (or group of IP addresses mapped to a single IP-address-linked identifier) that is a candidate for at least one of the N UUADs, the processor may identify the number K of the N UUADs for which the IP address (or group of IP addresses) is a candidate. The processor may further calculate respective prior probabilities $\{q_i\}$, i=1 . . . K, for these K UUADs, where each $q_i$ is the prior probability of the action being performed at the IP address (or at any IP address belonging to the group of IP addresses) at any hypothetical time that is sufficiently close to the approximate action-time of the $i^{th}$ one of the K UUADs.

Next, the processor may calculate U based on $$\binom{N}{K}(N\text{-choose-}K)$$

and $\{q_i\}$. For example, the processor may calculate U as $$\log(M) + \log\left(\binom{N}{K}\right) + \sum_{i=1}^{K}\log(q_i),$$

where log(M) is a suitable normalizing factor. (The log function may be to base 10, for example. It is noted that, in the context of the present application, including the claims, calculating a log-likelihood is included within the scope of calculating a likelihood.)

Similarly, to identify one or more candidate user-identifiers, with respective levels of confidence, for a particular IP address (or group of IP addresses mapped to a single IP-address-linked identifier), the processor may first collect, over a period of time, a set of N encrypted actions of a particular type (e.g., N encrypted uploads) performed at the IP address (or at any IP address belonging to the group of IP addresses). Next, for each of the N encrypted actions, the processor may identify the candidate corresponding UUADs, as described above with reference to FIG. 5B. For each user-identifier specified in a UUAD that is a candidate for at least one of the N encrypted actions, the processor may identify the number K of the N encrypted actions for which the user-identifier is specified in a candidate corresponding UUAD. The processor may further calculate respective prior probabilities $\{q_i\}$, i=1 . . . K, for these K encrypted actions, where each $q_i$ is the prior probability of an action of the particular type being performed, using the user-identifier, at any hypothetical time that is sufficiently close to the action-time of the $i^{th}$ one of the K encrypted actions. Next, the processor may calculate U based on $$\binom{N}{K}$$

and $\{q_i\}$, as described above.

In some embodiments, to compute the score for each candidate, the processor maps U to a range of scores between 0 and 1 (or between any other two suitable numbers), such that the score is a decreasing function of U. For example, values of U above a particular threshold T1 may be mapped to 0, values of U below another particular threshold T2 may be mapped to 1, and values of U between the two thresholds may be mapped to intermediate scores between 0 and 1. An example of such a mapping is Score=max(min ((U-T1)/(T2-T1),1),0).

In some cases, a user may use multiple different user-identifiers with the same service. For example, in some cases, multiple cryptocurrency transactions may be performed under different respective cryptocurrency addresses, even if the transactions are all performed by the same user. To address this challenge, the processor may use any suitable clustering technique to cluster the multiple user-identifiers, i.e., to identify that the user-identifiers belong to the same user. For example, the processor may identify a transaction in which two addresses appear together as inputs, indicating that the two addresses belong to a single user. Other clustering techniques are described in Ermilov et al., "Automatic bitcoin address clustering," Machine Learning and Applications (ICMLA), 2017 16th IEEE International Conference on IEEE, 2017, which is incorporated herein by reference.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
monitoring one or more flows of encrypted traffic between at least one Internet Protocol (IP) address and a peer-to-peer (P2P) network;
based on the monitoring, without decrypting the flows, identifying that a particular type of action was performed at the IP address at an action-time;
receiving, from a node in the P2P network, an indication that an action of the particular type was performed;
in response to receiving the indication, identifying an approximate action-time of the action;
ascertaining that a difference between the approximate action-time and the action-time is within a predefined range;
in response to ascertaining that the difference is within the predefined range, identifying the IP address as a candidate source of the action;
in response to identifying the IP address as a candidate source of the action, associating information relating to the action with at least one descriptor that is based on the IP address; and
generating an output that indicates the association.

2. The method of claim 1, wherein receiving the indication comprises receiving the indication by receiving a unit of user-action details (UUAD) specifying details of the action.

3. The method of claim 1, wherein the action includes a blockchain transaction.

4. The method of claim 3, wherein receiving the indication comprises receiving the indication by receiving a hash of the transaction.

5. The method of claim 1, wherein the descriptor includes the IP address.

6. The method of claim 5, wherein the descriptor consists of the IP address.

7. The method of claim 1, wherein the descriptor is selected from the group of descriptors consisting of: a device-identifier of a device that used the IP address, an account-identifier of an account to which the IP address was provisioned, and an attribute of a user who used the IP address.

8. The method of claim 1, further comprising:
computing a likelihood that the IP address was the source of the action; and
based on the likelihood, computing a level of confidence for associating the information with the descriptor,
wherein generating the output comprises generating the output in response to the level of confidence.

9. The method of claim 8, computing the likelihood comprises computing the likelihood based on the difference between the approximate action-time and the action-time.

10. The method of claim 8, further comprising receiving the indication from one or more other nodes in the P2P network, wherein computing the likelihood comprises computing the likelihood based on respective receipt-times at which the indication was received by the node and by the other nodes.

11. The method of claim 8,
wherein identifying that the particular type of action was performed comprises identifying that the particular type of action was performed by identifying a block of packets, belonging to the flows, that was generated in response to the particular type of action,
wherein the information is derived from a unit of user-action details (UUAD) specifying details of the action,
wherein the method further comprises identifying a degree of correlation between a block-size of the block of packets and a UUAD-size of the UUAD, and
wherein computing the likelihood comprises computing the likelihood in response to the degree of correlation.

12. The method of claim 1, wherein the approximate action-time is a time at which the indication was received by the node.

13. The method of claim 1, wherein the information is derived from a unit of user-action details (UUAD) specifying details of the action.

14. The method of claim 13, further comprising:
ascertaining that the flows were communicated between the IP address and a particular service; and
ascertaining, from the UUAD, that the action was performed using the particular service,
wherein identifying the IP address as a candidate source of the action comprises identifying the IP address as a candidate source of the action in response to (i) ascertaining that the flows were communicated between the IP address and the particular service, and (ii) ascertaining that the action was performed using the particular service.

15. The method of claim 13,
wherein the UUAD indicates that the action was performed at a particular time, and
wherein the approximate action-time is the particular time.

16. The method of claim 13, wherein the UUAD indicates that the action was performed under a particular user-identifier, and wherein the information includes the particular user-identifier.

17. The method of claim 16, wherein the particular user-identifier includes a blockchain address.

18. The method of claim 16, further comprising:
monitoring one or more other flows of encrypted traffic between another IP address and the P2P network;
based on the monitoring of the other flows, identifying that the particular type of action was performed at the other IP address at another action-time;
identifying the other IP address as another candidate source of the action, in response to another difference between the approximate action-time and the other action-time being within the predefined range; and
in response to identifying the other IP address as another candidate source, associating the particular user-identifier with another descriptor that is based on the other IP address.

19. The method of claim 18, further comprising:
receiving, from any node in the P2P network, another indication that another action was performed under the particular user-identifier;
in response to receiving the other indication, identifying another approximate action-time of the other action;
based on the other approximate action-time, ascertaining that the other IP address was not the source of the other action; and
in response to ascertaining that the other IP address was not the source of the other action, dissociating the particular user-identifier from the other descriptor.

20. The method of claim 1, further comprising:
receiving, from any node in the P2P network, another indication that another action of the particular type was performed;
in response to receiving the other indication, identifying another approximate action-time of the other action;
identifying the IP address as a candidate source of the other action, in response to another difference between the other approximate action-time and the action-time being within the predefined range; and
in response to identifying the IP address as a candidate source of the other action, associating other information relating to the other action with the descriptor.

21. The method of claim 1, further comprising:
in response to identifying that the particular type of action was performed, using the node, querying another node in the P2P network for any indications of new actions; and
receiving the indication, by the node, in response to the querying.

* * * * *